(12) United States Patent
Kadonaga et al.

(10) Patent No.: US 8,648,150 B2
(45) Date of Patent: Feb. 11, 2014

(54) METHOD FOR PRODUCING WATER ABSORBENT RESIN

(75) Inventors: Kenji Kadonaga, Himeji (JP); Kenji Tada, Himeji (JP); Masazumi Sasabe, Himeji (JP); Seiji Kato, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 64 days.

(21) Appl. No.: 13/254,573

(22) PCT Filed: Mar. 4, 2010

(86) PCT No.: PCT/JP2010/001521
§ 371 (c)(1),
(2), (4) Date: Sep. 2, 2011

(87) PCT Pub. No.: WO2010/100936
PCT Pub. Date: Sep. 10, 2010

(65) Prior Publication Data
US 2011/0319518 A1  Dec. 29, 2011

(30) Foreign Application Priority Data

Mar. 4, 2009 (JP) ................. 2009-050381
Aug. 27, 2009 (JP) ................. 2009-197091
Feb. 4, 2010 (JP) ................. 2010-022690

(51) Int. Cl.
C08F 20/02 (2006.01)
C08F 220/00 (2006.01)
B01F 13/00 (2006.01)
B01J 19/00 (2006.01)

(52) U.S. Cl.
USPC .......... 525/329.7; 525/329.5; 366/164.2; 422/138

(58) Field of Classification Search
USPC ......... 366/118, 167.1, 150.1, 69, 101, 164.2; 210/738; 523/111; 526/930; 525/329, 525/330.2, 329.5, 329.7; 528/502 R; 422/137
See application file for complete search history.

(56) References Cited

U.S. PATENT DOCUMENTS

| | | | |
|---|---|---|---|
| 4,507,473 A | 3/1985 | Bernert et al. | |
| 4,734,478 A | 3/1988 | Tsubakimoto et al. | |
| 4,755,562 A | 7/1988 | Alexander et al. | |
| 4,783,510 A | 11/1988 | Saotome | |
| 4,824,901 A | 4/1989 | Alexander et al. | |
| 5,064,582 A | 11/1991 | Sutton et al. | |
| 5,115,011 A | 5/1992 | Harada et al. | |
| 5,140,076 A | 8/1992 | Hatsuda et al. | |
| 5,206,205 A | 4/1993 | Tsai | |
| 5,264,495 A | 11/1993 | Irie et al. | |
| 5,422,405 A | 6/1995 | Dairoku et al. | |
| 5,610,208 A | 3/1997 | Dairoku et al. | |
| 5,672,633 A | 9/1997 | Brehm et al. | |
| 6,071,976 A | 6/2000 | Dairoku et al. | |
| 6,133,193 A | 10/2000 | Kajikawa et al. | |
| 6,228,930 B1 | 5/2001 | Dairoku et al. | |
| 6,239,230 B1 | 5/2001 | Eckert et al. | |
| 6,265,488 B1 | 7/2001 | Fujino et al. | |
| 6,297,319 B1 | 10/2001 | Nagasuna et al. | |
| 6,300,423 B1 | 10/2001 | Engelhardt et al. | |
| 6,372,852 B2 | 4/2002 | Hitomi et al. | |
| 6,458,921 B1 | 10/2002 | Dairoku et al. | |
| 6,472,478 B1 | 10/2002 | Funk et al. | |
| 6,514,615 B1 | 2/2003 | Sun et al. | |
| 6,559,239 B1 | 5/2003 | Riegel et al. | |
| 6,605,673 B1 | 8/2003 | Mertens et al. | |
| 6,620,899 B1 | 9/2003 | Morken et al. | |
| 6,657,015 B1 | 12/2003 | Riegel et al. | |
| 6,720,389 B2 | 4/2004 | Hatsuda et al. | |
| 6,809,158 B2 | 10/2004 | Ikeuchi et al. | |
| 6,875,511 B2 | 4/2005 | Dairoku et al. | |
| 7,288,601 B2 * | 10/2007 | Nogi et al. | ................. 525/329.5 |
| 8,349,913 B2 * | 1/2013 | Harren et al. | ................. 523/111 |
| 2001/0025093 A1 | 9/2001 | Ishizaki et al. | |
| 2002/0061978 A1 | 5/2002 | Hatsuda et al. | |
| 2003/0008946 A1 | 1/2003 | Dairoku et al. | |
| 2004/0106745 A1 | 6/2004 | Nakashima et al. | |
| 2004/0240316 A1 | 12/2004 | Nogi et al. | |

(Continued)

FOREIGN PATENT DOCUMENTS

| | | |
|---|---|---|
| CN | 1572820 | 2/2005 |
| CN | 1784430 | 6/2006 |

(Continued)

OTHER PUBLICATIONS

International Search Report for PCT/JP2010/001521 dated May 25, 2010.

(Continued)

*Primary Examiner* — Mark Eashoo
*Assistant Examiner* — Marilou Lacap
(74) *Attorney, Agent, or Firm* — Roylance, Abrams, Berdo & Goodman, L.L.P.

(57) ABSTRACT

The present invention is a method for producing a water absorbent resin which method is a method for producing surface cross-linked water absorbent resin particles, the method including the successive steps of: (a) adding a surface cross-linking agent and water to a particulate water absorbent resin in a mixer; and (b) reacting the resulting water absorbent resin mixture taken out from the mixer with the surface cross-linking agent in a reactor by heating or active energy ray irradiation, water vapor being used as part or all of the water added in the mixer. This makes it possible to provide a method for producing a water absorbent resin in which method a surface cross-linked water absorbent resin that has excellent properties can be obtained efficiently at low cost with high productivity.

6 Claims, 4 Drawing Sheets

(56) References Cited

U.S. PATENT DOCUMENTS

| | | |
|---|---|---|
| 2005/0048221 A1 | 3/2005 | Irie et al. |
| 2006/0057389 A1 | 3/2006 | Reimann et al. |
| 2006/0276598 A1 | 12/2006 | Wada et al. |
| 2007/0149760 A1 | 6/2007 | Kadonaga et al. |
| 2008/0227932 A1 | 9/2008 | Funk et al. |

FOREIGN PATENT DOCUMENTS

| | | |
|---|---|---|
| EP | 603292 | 6/1994 |
| EP | 0885917 | 12/1998 |
| EP | 1400556 | 3/2004 |
| EP | 1712584 | 10/2006 |
| EP | 1824910 | 8/2007 |
| JP | 52002877 | 1/1977 |
| JP | 63-99211 | 4/1988 |
| JP | 1-113406 | 5/1989 |
| JP | 1-297430 | 11/1989 |
| JP | 2-160814 | 6/1990 |
| JP | 3-152104 | 6/1991 |
| JP | 4-214734 | 8/1992 |
| JP | 4-227705 | 8/1992 |
| JP | 7-224204 | 8/1995 |
| JP | 7-242709 | 9/1995 |
| JP | 11-349625 | 12/1999 |
| JP | 2000-189794 | 7/2000 |
| JP | 2002-121291 | 4/2002 |
| JP | 2002-201290 | 7/2002 |
| JP | 2004-352940 | 12/2004 |
| JP | 2004-352941 | 12/2004 |
| JP | 2005-054151 | 3/2005 |
| JP | 2005-97585 | 4/2005 |
| JP | 2008-38128 | 2/2008 |
| WO | 2004/037900 | 5/2004 |
| WO | WO2008/141821 | * 11/2008 |

OTHER PUBLICATIONS

Chinese Office Action dated Nov. 13, 2012, from the Chinese Patent Office in corresponding Chinese Application No. 201080010035.3, and partial English translation.
Office Action dated May 24, 2013 in U.S. Appl. No. 12/673,425.
Supplementary European Search Report for EP 10748535.1, dated Mar. 16, 2013.
Chinese Office Action for CN 201080010035.3, dated Apr. 2, 2013, and English translation thereof.
International Search Report for PCT/JP2008/066371 dated Nov. 18, 2008.
European Search Report dated Jul. 26, 2011 of European Application No. 08829802.1.
US Office Action dated Jul. 10, 2012, from the U.S. Patent and Trademark Office in U.S. Appl. No. 12/673,425.
US Office Action dated Oct. 15, 2012, from the U.S. Patent and Trademark Office in U.S. Appl. No. 12/673,425.
US Office Action dated Feb. 15, 2013, from the U.S. Patent and Trademark Office in U.S. Appl. No. 12/673,425.

* cited by examiner

F I G. 5
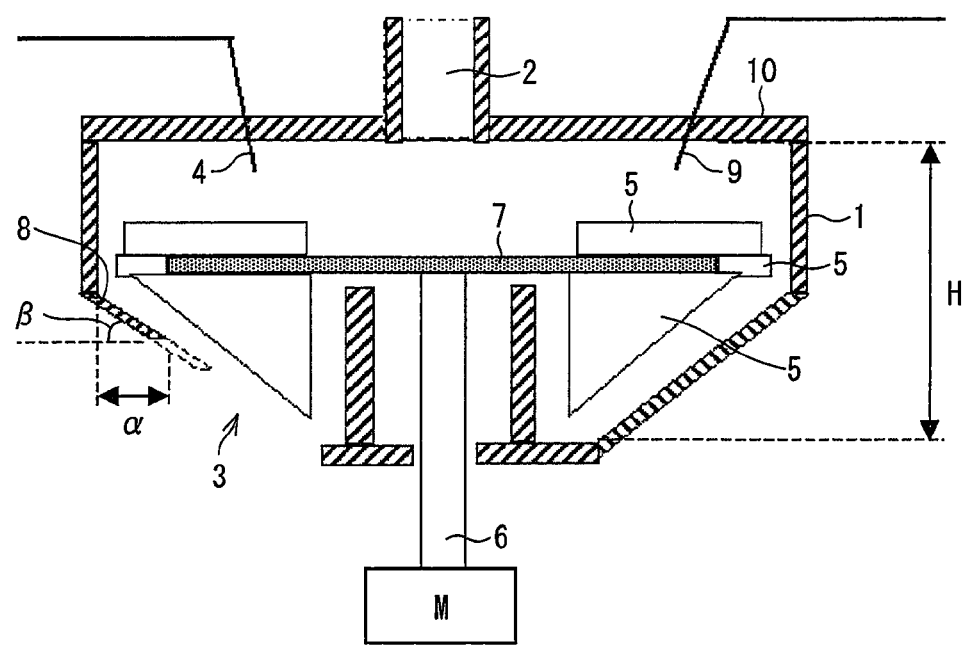

METHOD FOR PRODUCING WATER ABSORBENT RESIN

TECHNICAL FIELD

The present invention relates to a method for producing a water absorbent resin which has excellent properties and can be obtained efficiently at low cost with high productivity. More specifically, the present invention relates to a method for reforming and producing a water absorbent resin in which method a particulate water absorbent resin and an additive are mixed by use of a mixing apparatus having a specific structure and/or under a specific condition.

BACKGROUND ART

A water absorbent resin, which has a characteristic of absorbing an aqueous solution whose amount is as many as several times to several hundred times its own weight, is extensively used for, for example, sanitary materials such as a disposable diaper, a sanitary napkin, and an adult incontinence product, and a soil water retention agent. The water absorbent resin is produced and consumed in a large amount. Such a water absorbent resin (also referred to as a high water absorbent resin or a water absorbent polymer) is described in, for example, the Japanese Industrial Standards (JIS) K7223-1996. Further, the water absorbent resin is also introduced in many commercially-available reference books and thus has been publicly known.

Especially for use in sanitary materials such as a disposable diaper, a sanitary napkin, and an adult incontinence product, in order to make products thinner, a tendency has recently been shown toward use of a water absorbent resin in a larger amount and use of a pulp fiber in a smaller amount. This requires the water absorbent resin to carry out conventional functions of pulp to permeate and diffuse a liquid permeability in an absorbent core. An absorbency against pressure and liquid permeability of the water absorbent resin have been proposed as publicly-known indicators to evaluate superiority or inferiority of such functions, and the absorbency against pressure and the liquid permeability are desired to be high. In contrast, such a tendency toward thinner products leads to an increase in amount of the water absorbent resin used for each sanitary material. Accordingly, a demand for a low-cost water absorbent resin increases.

A water absorbent resin is commonly produced by drying a hydrogel polymer obtained by polymerizing an aqueous solution containing a hydrophilic monomer and a cross-linking agent, and carrying out a surface treatment with respect to the dried hydrogel polymer. For example, poly(meth)acrylic acid (salt) is well known as the hydrophilic monomer. A hydrogel polymer obtained by polymerizing the hydrophilic monomer is obtained as a mass or an agglomerate of hydrogel particles. Normally, the hydrogel polymer is roughly crushed (roughly disintegrated) to have a particle size of approximately 1 mm to 10 mm by use of a crusher such as a kneader or a meat chopper. Then, the hydrogel polymer thus roughly crushed (roughly disintegrated) is dried to have a solid content of approximately 95 wt %.

In a pulverizing step after the drying, the hydrogel polymer thus dried is pulverized into particles by use of a pulverizer so that the particles have a weight average particle size of not less than 150 µm and not more than 850 µm. A particulate water absorbent resin is thus obtained. In this case, particles whose size is beyond a desired particle diameter (particle size) range are also contained in the particulate water absorbent resin. Therefore, the polymer thus pulverized after the drying is sieved by use of a classifier so as to have a particle diameter falling within the desired particle diameter range. Though there is a difference between purposes of use, a particulate water absorbent resin having a particle size falling within a range of not less than 150 µm to less than 850 µm is normally preferably used for a sanitary material.

The particulate water absorbent resin is subjected to a surface treatment step and then obtains properties such as an absorbency against pressure and liquid permeability which are desirable for a sanitary material and the like. Normally, the surface treatment step refers to (i) a step (a surface cross-linking step) of providing a highly cross-linked layer in a vicinity of a surface of the particulate water absorbent resin by causing light or heat to react the particulate water absorbent resin with a surface cross-linking agent or a polymerizable monomer or (ii) a step (an adding step) of providing an additive layer in the vicinity of the surface of the particulate water absorbent resin by adding, to the particulate water absorbent resin, functionality giving additives (surface treatment agents) such as a liquid permeability enhancer, a deodorant agent, a color protector, an antibacterial agent, and an antiblocking agent.

Note that in surface cross-linking a water absorbent resin which is composed mainly of poly(meth)acrylic acid (salt), a surface cross-linking agent contains a cross-linking agent containing a functional group which can react with a carboxyl group, or a polymerizable monomer.

Examples of a conventionally studied surface cross-linking technique include a technique related to use of surface cross-linking agents in combination (Patent Literature 1), a technique related to an apparatus which mixes a water absorbent resin and a surface cross-linking agent (Patent Literature 2), a technique related to a heating apparatus for reacting a water absorbent resin with a surface cross-linking agent (Patent Literature 3), a technique related to temperature increase control of a heating temperature for reacting a water absorbent resin with a surface cross-linking agent (Patent Literature 4), and a technique related to a surface cross-linking treatment carried out with respect to a water absorbent resin having a high water content (Patent Literature 5). Techniques are also known such that differently from common surface cross-linking, a water absorbent resin is reformed by heat application without using a surface cross-linking treatment (Patent Literatures 6 and 7).

Various surface cross-linking agents have also been proposed. Examples of such a surface cross-linking agent include an oxazoline (Patent Literature 8), a vinyl ether compound (Patent Literature 9), an epoxy compound (Patent Literature 10), an oxetane compound (Patent Literature 11), a polyhydric alcohol compound (Patent Literature 12), polyamidepolyamine-epihalohydrin adducts (Patent Literatures 13 and 14), a hydroxy acrylamide compound (Patent Literature 15), an oxazolidinone compound (Patent Literature 16), bis or poly-oxazolidinone compound (Patent Literature 17), 2-oxotetrahydro-1,3-oxazolidine compound (Patent Literature 18), and an alkylene carbonate compound (Patent Literature 19).

Further, techniques are also known for surface cross-linking by polymerizing a monomer (Patent Literatures 20 and 21) and for radical cross-linking by use of persulfate or the like (Patent Literature 22). Note that, since a radical cross-linking reaction requires retention of water contained in a water absorbent resin, Patent Literatures 21 and 22 describe that heat drying is carried out in an atmosphere of superheated steam.

A technique has also been proposed for using an additive in combination to mix a surface cross-linking agent with a water absorbent resin. Examples of the additive include water-soluble cations such as an aluminum salt (Patent Literatures 24 and 25), alkali (Patent Literature 26), and an organic acid and an inorganic acid (Patent Literature 27). A technique is also known for using a specific mixer for a mixer of a surface cross-liking agent with a water absorbent resin (Patent Literature 27).

Proposed examples of a technique for use in a heating step include a technique for carrying out surface cross-linking two times (Patent Literature 29), a technique for using a plurality of heating treatment apparatuses (Patent Literature 30), and techniques for preliminarily heating a water absorbent resin which has not been surface cross-linked (Patent Literatures 31 and 32). Besides Patent Literatures 20 and 21, techniques have also been proposed for using water vapor for a heat reaction in a step of heating a water absorbent resin with which a surface cross-linking agent that reacts with a carboxyl group is mixed (Patent Literatures 33 and 34).

As for a technique for mixing a particulate water absorbent resin and a surface treatment agent, several methods have been devised for controlling a movement of a particulate water absorbent resin in a mixer. Such a method is exemplified by a method for causing an air current caused by a stirring vane to control a movement of a particulate water absorbent resin which moves in a mixing vessel by.

For example, Patent Literature 28 describes that a speed at which a particulate water absorbent resin moves in a mixing vessel toward an outlet is changed by a direction of a stirring vane between a dispersion process and a mixing process of the particulate water absorbent resin.

Patent Literature 35 describes that mixing property is enhanced in a mixer by causing a stirring vane to adjust a ratio between particulate water absorbent resins moving in opposite directions: toward an outlet of the mixer and toward an inlet of the mixer. Patent Literature 35 also describes that, since a particulate water absorbent resin to which a surface treatment agent is adhered agglomerates and causes mixing property to deteriorate, a particulate water absorbent resin has kinetic energy enough to prevent agglomeration of the particulate water absorbent resin in a mixing process.

Patent Literature 35 also describes, as a mixer used to mix a particulate water absorbent resin and an additive, apparatuses such as a Patterson-Kelly mixer, a DRAIS turbulent mixer, a Lödige mixer, a Ruberg mixer, a screw mixer, a Pan mixer, a fluidized-bed mixer, an MTI mixer, and a Schugi mixer.

Patent Literature 2 describes a technique for using a water-repellent base material for an inner wall of a mixer to prevent adhesion of a particulate water absorbent resin and enhance mixing property. Patent Literature 2 also describes mixers used to mix the particulate water absorbent resin and a surface cross-linking agent such as Henschel Mixer (produced by Mitsui Miike Machinery Co., Ltd.), New Speed Mixer (produced by Okada Seiko Co., Ltd.), Heavy Duty Matrix (produced by Nara Machinery Co., Ltd.), and Turbulizer and Sand Turbo (which are produced by Hosokawa Micron Group).

As another method for controlling a movement of a particulate water absorbent resin in a mixing vessel, Patent Literature 36 describes that, in a case where a horizontal mixer, i.e., a mixer having stirring vanes whose revolving shafts are in a horizontal direction, is provided, in a vicinity of its outlet or between the stirring vanes, with a dam having whose height is not more than 50% of a revolving circumferential diameter, it is possible to (i) control time for which the particulate water absorbent resin resides in the mixing vessel and (ii) prevent the particulate water absorbent resin from passing straight through the mixer.

In contrast, a particulate water absorbent resin which is produced in a series of production processes of a water absorbent resin and is smaller than a desired particle size range is called fine powder. Especially fine powder whose particle size is less than 150 μm is unsuitable for use in a sanitary material since an absorbing article such as a diaper clogged with the fine powder may cause a deterioration in liquid permeability.

However, since disposal of fine powder causes problems of a yield reduction and a disposal cost, it is known that fine powder is appropriately collected and recycled. Examples of a known method for recycling fine powder include a method in which the fine powder is added to a monomer regulator, so as to be recycled (for example, see Patent Literature 37) and a method in which the fine powder is added to and mixed with a gel substance being polymerized or having been polymerized, so as to be recycled (for example, see Patent Literature 38). However, the method in which the fine powder is added to the monomer regulator or the gel substance as described above has a problem such that it is difficult to mix the fine powder and the monomer regulator or the gel substance.

As another method for collecting fine powder, a method is known in which fine powder is collected by adding a binding agent as an additive to the fine powder and binding the fine powder so that the bound fine powder has a particle size of not less than 150 μm (for example, see Patent Literature 39).

An aqueous solution or a fine particle aqueous dispersion liquid is commonly preferably usable as a binding agent for fine powder in view of efficiency, safety, production cost, and the like. In order to enhance mixing property of fine powder and a binding agent, there are known a method using hot water as a binding agent (Patent Literature 40) and a method using water vapor as a binding agent (Patent Literature 41). These Patent Literatures describe that a high-speed stirring mixer such as Turbulizer (produced by Hosokawa Micron Group), Lödige mixer (produced by Lödige), or Mortar Mixer (produced by Nishinihon Shikenki) is used to mix fine powder and a binding agent. A method is also known for binding fine powder by use of a specific mixer (Patent Literature 42).

CITATION LIST

Patent Literature 1
Specification of U.S. Pat. No. 5,422,405
Patent Literature 2
Japanese Patent Application Publication, Tokukaihei, No. 4-214734 A
Patent Literature 3
Japanese Patent Application Publication, Tokukai, No. 2004-352941 A
Patent Literature 4
Specification of U.S. Pat. No. 6,514,615
Patent Literature 5
Specification of U.S. Pat. No. 6,875,511
Patent Literature 6
Specification of U.S. Pat. No. 5,206,205
Patent Literature 7
Specification of European Patent No. 0603292
Patent Literature 8
Specification of U.S. Pat. No. 6,297,319
Patent Literature 9
Specification of U.S. Pat. No. 6,372,852
Patent Literature 10
Specification of U.S. Pat. No. 6,265,488
Patent Literature 11
Specification of U.S. Pat. No. 6,809,158
Patent Literature 12
Specification of U.S. Pat. No. 4,734,478

Patent Literature 13
Specification of U.S. Pat. No. 4,755,562
Patent Literature 14
Specification of U.S. Pat. No. 4,824,901
Patent Literature 15
Specification of U.S. Pat. No. 6,239,230
Patent Literature 16
Specification of U.S. Pat. No. 6,559,239
Patent Literature 17
Specification of U.S. Pat. No. 6,472,478
Patent Literature 18
Specification of U.S. Pat. No. 6,657,015
Patent Literature 19
Specification of U.S. Pat. No. 5,672,633
Patent Literature 20
Specification of U.S. Patent Application Publication No. 2005/48221
Patent Literature 21
Japanese Patent Application Publication, Tokukaihei, No. 2-160814 A
Patent Literature 22
Specification of U.S. Pat. No. 4,783,510
Patent Literature 23
Specification of European Patent No. 1824910
Patent Literature 24
Specification of U.S. Pat. No. 6,605,673
Patent Literature 25
Specification of U.S. Pat. No. 6,620,899
Patent Literature 26
Specification of U.S. Patent Application Publication No. 2004/106745
Patent Literature 27
Specification of U.S. Pat. No. 5,610,208
Patent Literature 28
Specification of U.S. Pat. No. 6,071,976
Patent Literature 29
Specification of U.S. Pat. No. 5,672,633
Patent Literature 30
Specification of U.S. Patent Application Publication No. 2007/0149760
Patent Literature 31
Japanese Patent Application Publication, Tokukaihei, No. 7-242709 A
Patent Literature 32
Japanese Patent Application Publication, Tokukaihei, No. 7-224204 A
Patent Literature 33
Japanese Patent Application Publication, Tokukaihei, No. 1-113406 A
Patent Literature 34
Japanese Patent Application Publication, Tokukaihei, No. 1-297430 A
Patent Literature 35
International Publication No. 2004/037900
Patent Literature 36
Japanese Patent Application Publication, Tokukai, No. 2004-352940 A
Patent Literature 37
Japanese Patent Application Publication, Tokukaihei, No. 04-227705 A
Patent Literature 38
Japanese Patent Application Publication, Tokukaihei, No. 03-152104 A
Patent Literature 39
Japanese Patent Application Publication, Tokukai, No. 2000-189794 A
Patent Literature 40
Specification of U.S. Pat. No. 6,458,921
Patent Literature 41
Japanese Patent Application Publication, Tokukai, No. 2005-054151 A
Patent Literature 42
Specification of U.S. Pat. No. 6,133,193

SUMMARY OF INVENTION

Technical Problem

However, though many techniques are provided such as many surface cross-linking agents described above (Patent Literatures 8 through 19) and use of surface cross-linking agents in combination (Patent Literature 1), apparatuses for mixing a surface cross-linking agent with a water absorbent resin (Patent Literatures 2 and 28), auxiliary agents for surface cross-linking (Patent Literatures 24 through 27), and methods for carrying out a heat treatment with respect to a surface cross-linking agent (Patent Literatures 3, 4, and 29 through 34), it is difficult to cause only these surface cross-linking techniques to respond to an increasing demand from a user for properties of a water absorbent resin such as an absorbency against pressure and liquid permeability. An increase in cost, lower safety, and a deterioration in other properties (e.g., a deterioration in color of a water absorbent resin) may be observed in accordance with a change of surface cross-linking agents and a use of a new auxiliary agent.

Further, the techniques described above yield a certain effect in production in a small scale at a laboratory level or by a batch method, whereas the techniques may yield less effect in continuous production in an industrial scale (for example, at a rate of not less than 1 t per unit time) than in production in a small scale.

In order to mix a particulate water absorbent resin and an additive as described earlier, many techniques related to a mixer and a mixing method have been proposed. However, though these techniques make it possible to produce a water absorbent resin having high properties by mixing in a laboratory scale, in a case where continuous mixing is carried out at a high throughput rate of more than 1 t/hr so as to mass-produce water absorbent resins, adhesion and a deterioration in properties due to a deterioration in mixing property frequently occur.

Such a phenomenon is regarded as occurrence of uneven mixing though the technique described earlier for controlling a movement of a particulate water absorbent resin in a mixing vessel is used. In a case where the mixer is extended in a revolving shaft direction, it is commonly possible to cause the particulate water absorbent resin to be less likely to pass straight through the mixer. However, many stirring vanes need to be provided so as to control a movement of a particulate water absorbent resin in a mixing vessel. This produces more projections to which the particulate water absorbent resin is easily adhered.

A water absorbent resin which unnecessarily resides for a long time may not lead to enhancement of properties. In a case where more dams are provided or a larger dam is provided in a horizontal mixer, a mixing vessel is easily blocked (see Patent Literature 2). Therefore, in order to mass-produce water absorbent resins, there is no choice but provide more mixers by reducing a throughput rate per mixer. This increases device cost and causes steps to be more complicated by branching a production line.

In a case where an additive is used as a surface cross-linking agent and the additive is not evenly mixed with a particulate water absorbent resin, a surface cross-linked layer is formed only in a part of a surface of the particulate water absorbent resin. This dramatically impairs an absorbency against pressure and liquid permeability of a water absorbent resin. Further, other surface treatment agents may be used in larger amounts so as to yield effects and may impair properties of the water absorbent resin.

Fine powder has a large surface area with respect to its weight and is particularly difficult to mix evenly. As a result, mixing of fine powder and a binding agent may cause the resulting bound product to be weak in binding power and to be easily broken. Therefore, according to a conventional technique, a large amount of water is used as a binding agent to spread the binding agent through the whole fine powder, and a water content of the resulting bound product exceeds 50 wt %. This causes a problem such that considerable energy is necessary for drying the bound product.

In contrast, a method in which fine powder is bound only by use of water vapor as described in Patent Literature 40 allows a reduction in water content of a bound product. However, according to the method disclosed in Patent Literature 40, fine powder is mixed for a long time so as to be bound sufficiently. This makes it difficult to cause a mixer to operate continuously.

The present invention has been made in view of the problems, and an object of the present invention is to provide a method for producing a surface cross-linked water absorbent resin which has excellent properties and can be obtained efficiently at low cost with high productivity, especially a method for mixing a water absorbent resin and an additive.

Solution to Problem

Inventors of the present invention carried out various studies. As a result, in order to attain the object, a method of the present invention for producing a water absorbent resin which method is a method for producing surface cross-linked water absorbent resin particles, the method includes the successive steps of: (a) adding a surface cross-linking agent and water to a particulate water absorbent resin in a mixer; and (b) reacting the resulting water absorbent resin mixture taken out from the mixer with the surface cross-linking agent in a reactor by heating or active energy ray irradiation, water vapor being used as a part or all of the water added in the mixer.

According to the present invention, in surface cross-linking a water absorbent resin, it is possible to enhance properties (e.g., an absorbency against pressure (AAP) and liquid permeability (SFC)) of the surface cross-linked water absorbent resin without changing surface cross-linking agents or using a new auxiliary agent. Though scale-up in a production process has caused a deterioration in properties, the present invention causes little deterioration in properties even at the time of continuous production and/or scale-up.

For a fuller understanding of the nature and advantages of the invention, reference should be made to the ensuing detailed description taken in conjunction with the accompanying drawings.

Advantageous Effects of Invention

According to a method of the present invention for producing a water absorbent resin, a particulate water absorbent resin which has excellent properties can be obtained efficiently with high productivity by evenly mixing the particulate water absorbent resin and an additive.

BRIEF DESCRIPTION OF DRAWINGS

FIG. 5 is a cross-sectional view schematically illustrating an arrangement of a mixer used in each of Examples 12 and 13, and Comparative Example 6.

DESCRIPTION OF EMBODIMENTS

Figure 1:
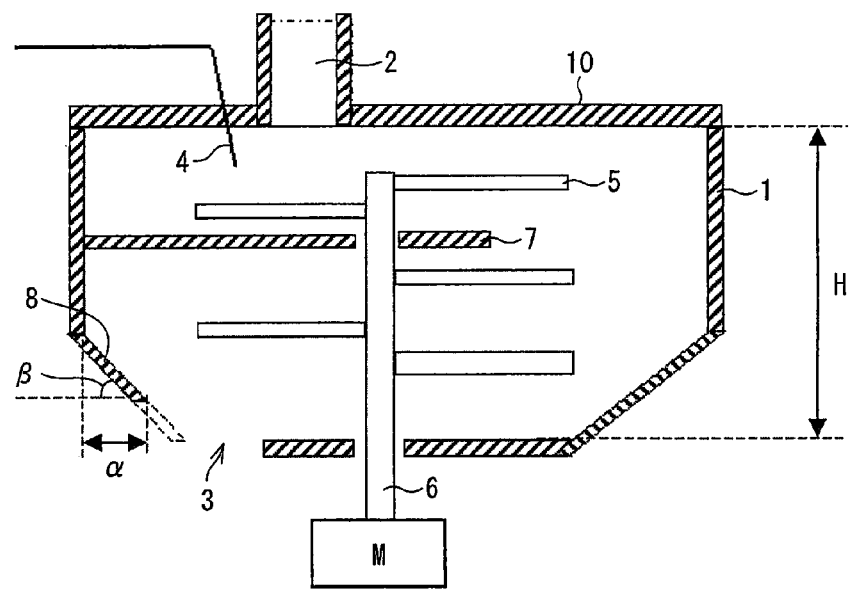
FIG. 1 is a cross-sectional view schematically illustrating an arrangement of an example of a mixer which is usable for a method in accordance with the present embodiment.

Though the following descriptions specifically discuss the present invention, the present invention is not limited to those descriptions, but rather may be applied in many variations within the scope of the present invention. Specifically, the present invention is not limited to the description of the embodiments below, but may be altered by a skilled person within the scope of the claims. An embodiment based on a proper combination of technical means disclosed in different embodiments is encompassed in the technical scope of the present invention. Note that "mass" is synonymous with "weight" in the present specification.

The embodiments of the present invention are described below. Note that [1] describes definitions of terms and [2] describes a typical method for producing a water absorbent resin. (2-6) describes a step of carrying out a surface treatment, which step is a characteristic part of the present invention. Of the step, (2-6-1) describes a step of carrying out surface cross-linking, (2-6-2) describes a step of adding a functionality giving additive such as a liquid permeability enhancer, and (2-7) describes a step of binding fine powder. These steps may be carried out by a batch method or a continuous method, and it is industrially preferable that the steps be connected and continuous production be carried out as a whole. In particular, a particulate water absorbent resin and an additive are mixed continuously.

[1] Definitions of Terms (1-1) "Water Absorbent Resin"

A "water absorbent resin" of the present invention refers to a water-swelling and water-insoluble polymer gelatinizer. Note that "water-swelling" refers to a state in which CRC (an absorbency against non-pressure) defined by ERT441.2-02 is normally not less than 5 [g/g]. Note also that "water-insoluble" refers to a state in which Ext (a water-soluble content) defined by ERT470.2-02 is normally 0 wt % to 50 wt % (especially not more than 20 wt %).

The water absorbent resin can be appropriately designed according to purposes and is not particularly limited. The water absorbent resin is preferably a hydrophilic cross-linked polymer obtained by cross-linking and polymerizing an unsaturated monomer containing a carboxyl group. Note that a total amount (100 wt %) of the water absorbent resin does not need to be a polymer. The water absorbent resin may contain an additive and the like provided that the water absorbent resin can maintain its performance described above.

(1-2) "Polyacrylic Acid (Salt) Water Absorbent Resin"

A "polyacrylic acid (salt) water absorbent resin" of the present invention refers to a water absorbent resin which is composed mainly of acrylic acid and/or a salt thereof (hereinafter referred to as acrylic acid (salt)) as a repeating unit.

Specifically, the "polyacrylic acid (salt) water absorbent resin" refers to a polymer which contains acrylic acid (salt) in an amount normally of 30 mol % to 100 mol %, and preferably of 50 mol % to 100 mol % of total monomers (excluding a cross-linking agent) used for polymerization. The "polyacrylic acid (salt) water absorbent resin" refers to a water absorbent resin (a water-swelling and water-insoluble cross-linking agent polymer) which contains acrylic acid (salt) in an amount preferably of 70 mol % to 100 mol %, more preferably of 90 mol % to 100 mol %, and particularly preferably of substantially 100 mol %.

(1-3) "EDANA" and "ERT"

"EDANA" is an abbreviation for European Disposables and Nonwovens Associations, and "ERT" is an abbreviation for EDANA Recommended Test Method which is an European standard (substantially a world standard) method for measuring a water absorbent resin. Note that in the present invention, properties of a water absorbent resin and the like are measured in conformity with the original document of ERT (publicly known document: revised in 2002) unless otherwise noted.

(a) "CRC" (ERT441.2-02)

"CRC", which is an abbreviation for Centrifuge Retention Capacity, refers to an absorbency against non-pressure (hereinafter may be referred to as an "absorbency"). Specifically, the "CRC" refers to an absorption capacity (unit: [g/g]) obtained by causing a water absorbent resin to be freely swollen in a 0.9 wt % sodium chloride aqueous solution for 30 minutes and then draining the water absorbent resin by use of a centrifugal separator.

(b) "AAP" (ERT441.2-02)

"AAP", which is an abbreviation for Absorption Against Pressure, refers to an absorbency against pressure. Specifically, the "AAP" refers to an absorption capacity (unit: [g/g]) obtained by causing a water absorbent resin to be swollen in a 0.9 wt % sodium chloride aqueous solution under a pressure of 2.06 kPa for 1 hour. However, in the present invention, the "AAP" is an absorption capacity (unit: [g/g]) obtained by causing a water absorbent resin to be swollen in a 0.9 wt % sodium chloride aqueous solution under a pressure of 4.83 kPa for 1 hour.

(c) "Ext" (ERT470.2-02)

"Ext", which is an abbreviation for Extractables, refers to a water-soluble content (a water-soluble component amount). Specifically, the "Ext" is a value (unit: wt %) obtained by measuring an amount of molten polymer by pH titration after stirring 1 g of a water absorbent resin in 200 g of a 0.9 wt % sodium chloride aqueous solution for 16 hours.

(1-4) Liquid Permeability

A flow of a liquid flowing among particles of a swollen gel under a pressure or under no pressure is referred to as "liquid permeability". A typical method for measuring the "liquid permeability" is exemplified by SFC (Saline Flow Conductivity) and GBP (Gel Bed Permeability).

The "SFC (physiological saline flow conductivity)" refers to liquid permeability of a 0.69 wt % physiological saline with respect to a water absorbent resin under a pressure of 0.3 psi". The "SFC" is measured in conformity with an SFC test method described in the specification of U.S. Pat. No. 5,669,894.

The "GBP" refers to liquid permeability of a 0.69 wt % physiological saline with respect to a water absorbent resin which is under a pressure or freely expands. The "GBP" is measured in conformity with a GBP test method described in International Publication No. 2005/016393.

(1-5) Others

In the present specification, "X to Y" indicating a range refers to "not less than X and not more than Y", and "(meth)acrylic" used in (meth)acrylic acid and the like refers to acrylic or methacrylic. Furthermore, "t (ton)", which is a unit of weight, refers to "metric ton". Moreover, "ppm" refers to "weight ppm" or "mass ppm" unless otherwise noted.

[2] Method for Producing Water Absorbent Resin (2-1) Acrylic Acid (Salt) Aqueous Solution (a) Monomer Examples of an unsaturated monomer usable for the present invention include hydrophilic monomers such as acrylic acid, methacrylic acid, (anhydrous) maleic acid, fumaric acid, crotonic acid, itaconic acid, vinylsulfonic acid, 2-(meth)acrylamide-2-methylpropanesulfonic acid, (meth)acryloxyalkane sulfonic acid, N-vinyl-2-pyrrolidone, N-vinylacetamide, (meth)acrylamide, N-isopropyl(meth)acrylamide, N,N-dimethyl(meth)acrylamide, 2-hydroxyethyl (meth)acrylate, methoxypolyethylene glycol (meth)acrylate, and polyethylene glycol (meth)acrylate, and salts of these hydrophilic monomers.

For example, a water absorbent resin can be appropriately obtained by use of (i) acrylic acid alone, (ii) acrylic acid and a monomer other than acrylic acid in combination, or (iii) a monomer alone other than acrylic acid of these monomers. It is preferable to use acrylic acid and/or a salt thereof as an unsaturated monomer from the viewpoint of properties (e.g., an absorption capacity, a water-soluble content, a residual monomer, and liquid permeability) of a water absorbent resin.

In a case where acrylic acid and/or a salt thereof are/is used as an unsaturated monomer, acrylic acid (salt) which contains 1 mol % to 50 mol % acrylic acid and 50 mol % to 99 mol % alkali metal salt of the acrylic acid is most preferably used.

In a case where an acid radical-containing monomer and acrylic acid are used as repeating units of a polymer, a monovalent salt, preferably alkali metal salt or ammonium salt, more preferably alkali metal salt, and particularly preferably sodium salt is used as the acid radical. The acid radical is neutralized before or after polymerization in a range of 0 mol % to 100 mol %, preferably of 20 mol % to 100 mol %, more preferably of 50 mol % to 99 mol %, and still more preferably of 60 mol % to 90 mol %.

(b) Cross-Linking Agent

Examples of an optionally usable cross-linking agent include compounds having at least two polymerizable double bonds in their molecules such as N,N'-methylenebis(meth)acrylamide, (poly)ethylene glycol di(meth)acrylate, (poly)propylene glycol di(meth)acrylate, (polyoxyethylene)trimethylolpropane tri(meth)acrylate, trimethylolpropane di(meth)acrylate, polyethylene glycol di(β-acryloyloxy propionate), trimethylolpropane tri(β-acryloyloxy propionate), and poly(meth)allyloxyalkane; and one or two or more kinds of compounds which can form a covalent bond by reacting with a carboxyl group such as polyglycidyl ether (ethylene glycol diglycidyl ether) and polyols (ethylene glycol, polyethylene glycol, glycerin, and sorbitol).

In a case where a cross-linking agent is used, it is preferable to essentially use a compound having at least two polymerizable double bonds in its molecule in view of absorption properties of the resulting water absorbent resin. From the viewpoint of properties, the cross-linking agent is used in an amount of 0.0001 mol % to 5 mol %, and preferably of 0.005 mol % to 2 mol % with respect to the monomer.

(c) Concentration

Such a monomer as described above is normally polymerized in an aqueous solution at a concentration normally of 10 wt % to 90 wt %, preferably of 20 wt % to 80 wt %, more preferably of 30 wt % to 70 wt %, and particularly preferably of 30 wt % to 60 wt %.

For the aqueous solution, it is possible to use in combination a surfactant, polyacrylic acid (salt) and a cross-linked polymer thereof (water absorbent resin), starch, and a high polymer compound such as polyvinyl alcohol, various chelating agents, various additives, and the like in an amount of more than 0 wt % and not more than 30 wt % with respect to the monomer. Note that in the present invention, the aqueous solution, which includes a dispersion liquid whose concentration exceeds a saturation concentration, is preferably polymerized at a concentration which is not more than the saturation concentration.

(2-2) Polymerization Step (a) Polymerization Method

A water absorbent resin of the present invention is produced by obtaining a hydrogel polymer by internal cross-linking and polymerizing the unsaturated monomer. From the viewpoint of performance and easiness of control of polymerization, the polymerization is normally carried out by spray polymerization, drop polymerization, aqueous solution polymerization, or reverse phase suspension polymerization, particularly preferably by aqueous solution polymerization in which it has been difficult to carry out particle size control since particles of the water absorbent resin are indefinite in shape, and more preferably by continuous aqueous solution polymerization.

The reverse phase suspension polymerization is a polymerization method in which a monomer aqueous solution is suspended in a hydrophobic organic solvent. For example, the reverse phase suspension polymerization is described in U.S. patents such as U.S. Pat. No. 4,093,776, U.S. Pat. No. 4,367,323, U.S. Pat. No. 4,446,261, U.S. Pat. No. 4,683,274, and U.S. Pat. No. 5,244,735. The aqueous solution polymerization is a method in which a monomer aqueous solution is polymerized without using any dispersion solvent. For example, the aqueous solution polymerization method is described in U.S. patents such as U.S. Pat. No. 4,625,001, U.S. Pat. No. 4,873,299, U.S. Pat. No. 4,286,082, U.S. Pat. No. 4,973,632, U.S. Pat. No. 4,985,518, U.S. Pat. No. 5,124,416, U.S. Pat. No. 5,250,640, U.S. Pat. No. 5,264,495, U.S. Pat. No. 5,145,906, and U.S. Pat. No. 5,380,808; and European Patents such as European Patent No. 0811636, European Patent No. 0955086, European Patent No. 0922717, and European Patent No. 1178059. Note that a monomer, a cross-linking agent, a polymerization initiator, other additives, and the like that are described in these documents are also usable for polymerization in the present invention.

From the viewpoint of yielding a greater effect, preferably the aqueous solution polymerization or the reverse phase suspension polymerization, more preferably the aqueous solution polymerization, still more preferably the continuous aqueous solution polymerization, and particularly preferably continuous belt polymerization or continuous kneader polymerization is applied.

From the viewpoint of properties and drying efficiency, it is preferable to cause polymerization heat generated during such polymerization to volatilize at least a part of a polymerization solvent. For example, it is only necessary that a solid content be increased before and after polymerization by not less than 0.1 wt %, preferably by 1 wt % to 40 wt %, more preferably by 2 wt % to 30 wt %, and particularly preferably by 3 wt % to 20 wt %. Such an increase in solid content is appropriately determined by, for example, a temperature during polymerization (e.g., polymerization at a boiling point), an air current, and/or a shape (a particle size and/or a sheet thickness of a polymerized gel).

Such polymerization, which can be carried out in an air atmosphere, is carried out in an atmosphere of an inert gas such as nitrogen or argon, for example, at an oxygen concentration of not more than 1 vol %. It is preferable that a monomer content be used for polymerization after its dissolved oxygen is sufficiently substituted with the inert gas and then the oxygen concentration becomes less than 1 [mg/L] (ppm).

The present invention has a greater effect on particle size control carried out in production or pulverization in a real machine scale, especially in an enormous scale than in a laboratory scale. Therefore, the present invention can be employed especially in continuous polymerization and continuous pulverization in which an unsaturated monomer aqueous solution is polymerized, so as to produce or pulverize, in one production line, a water absorbent resin in an enormous scale of not less than 1 [t/hr], more preferably of not less than 2 [t/hr], still more preferably of not less than 5 [t/hr], and particularly preferably of not less than 10 [t/hr]. An upper limit of production is appropriately set to, for example, 100 [t/hr].

Accordingly, examples of preferable continuous polymerization include continuous kneader polymerization (e.g., U.S. Pat. No. 6,987,151, U.S. Pat. No. 6,710,141, and U.S. Patent Application Publication No. 2008/0080300) and continuous belt polymerization (e.g., U.S. Pat. No. 4,893,999, U.S. Pat. No. 6,241,928, and U.S. Patent Application Publication No. 2005/215734).

Examples of a method for polymerizing an aqueous solution include a static polymerization method in which a monomer aqueous solution is polymerized in a static state and a stirring polymerization method in which a monomer aqueous solution is polymerized in a stirring apparatus. It is preferable to use an endless belt for the static polymerization method. For the stirring polymerization method, a single shaft stirrer is usable, but a stirrer such as a kneader which is provided with a plurality of stirring shafts is preferably used.

The polymerization method of the present invention is specifically exemplified by a continuous polymerization method which uses an endless belt and is carried out at a high monomer concentration (see Japanese Patent Application Publication, Tokukai, No. 2005-307195 A). Such continuous belt polymerization or continuous kneader polymerization is preferably applicable to the present invention.

Note that continuous polymerization is preferably exemplified by polymerization which is initiated at a high temperature (for example, in a state in which a temperature of a monomer is not less than 30° C., more preferably not less than 35° C., still more preferably not less than 40° C., and particularly preferably not less than 50° C., and an upper limit of the temperature is a boiling point) and carried out at a high monomer concentration (for example, of not less than 30 wt %, more preferably of not less than 35 wt %, still more preferably of not less than 40 wt %, and particularly preferably of not less than 45 wt %, and an upper limit of a saturation concentration).

(b) Polymerization Initiator

A polymerization initiator for use in the present invention is appropriately selected in accordance with a form of polymerization. Such a polymerization initiator is exemplified preferably by a water-soluble polymerization initiator, and more preferably by a photolytic polymerization initiator, a pyrolytic polymerization initiator, and a redox polymerization initiator. In the present invention, it is also preferable to use a photolytic polymerization initiator and a pyrolytic polymerization initiator in combination.

Examples of the photolytic polymerization initiator include a benzoin derivative, a benzyl derivative, an acetophenone derivative, a benzophenone derivative, and an azo compound.

Examples of the pyrolytic polymerization initiator include persulfates such as sodium persulfate, potassium persulfate, and ammonium persulfate; peroxides such as hydrogen peroxide, t-butyl peroxide, and methylethylketone peroxide; and azo compounds such as an azo nitrile compound, an azo amidine compound, an annular azo amidine compound, an azo amide compound, an alkyl azo compound, 2,2'-azobis(2-amidino propane)dihydrochloride, and 2,2'-azobis[2-(2-imidazoline-2-yl)propane]dihydrochloride.

The redox polymerization initiator is exemplified by a polymerization initiator in which a reducing compound such as L-ascorbic acid or sodium hydrogen sulfite is used in combination with a persulfate or a peroxide described above to combine the reducing compound and the persulfate or the peroxide. The polymerization initiator is used in an amount of 0.0001 mol % to 1 mol %, and preferably of 0.001 mol % to 0.5 mol % with respect to the monomer.

(2-3) Step of Fine-Graining Hydrogel Polymer

From the viewpoint of drying efficiency, pulverization efficiency after drying, and properties, it is preferable that a hydrogel polymer which has not been dried be fine-grained during or after polymerization.

For example, a massive, sheet, or the like hydrogel polymer (hydro-cross-linked polymer) which is obtained by aqueous solution polymerization (especially in a case where continuous belt polymerization is used) in the present invention is crushed by a crusher to be a particulate hydrogel, so that the particulate hydrogel is dried. Spray polymerization, drop polymerization, or reverse phase suspension polymerization allows obtainment of a particulate hydrogel by polymerization. The particulate hydrogel subjected to polymerization may be dried as it is, or its particle size may be adjusted by further crushing or binding the particulate hydrogel according to need.

A weight average particle diameter (D50) of the particulate hydrogel falls within a range preferably of 0.5 mm to 10 mm, more preferably of 1 mm to 5 mm, still more preferably of 1 mm to 3 mm, and particularly preferably of 1 mm to 2 mm, the weight average particle diameter being found by standard sieve classification.

Note that employable examples of a method for controlling the weight average particle diameter to fall within the above range in the step of fine-graining the hydrogel polymer include U.S. Pat. No. 6,906,159, U.S. Pat. No. 5,275,773, U.S. Pat. No. 6,100,305, U.S. Pat. No. 6,140,395, U.S. Pat. No. 6,875,511, U.S. Patent Application Publication No. 2004/234607, and U.S. Patent Application Publication No. 2005/46069.

(2-4) Drying Step

The hydrogel polymer, preferably the particulate hydrogel polymer is dried to have a solid content in which it can be pulverized. Note here that a form of a hydrophilic cross-linked polymer (a hydrogel polymer) which is to be subjected to a drying step is a hydrogel and an agglomerate thereof, or a sheet hydrogel which is roughly crushed by use of a kneader, a meat chopper, or a cutter. The drying step may appropriately include a step of disintegrating or pulverizing the agglomerate. For example, U.S. Pat. No. 6,187,902 is employed as such a technique.

Various methods are employable as a drying method of the present invention so that a desired water content is obtained. Examples of the drying method include heat drying, hot-air drying, vacuum drying, infrared drying, microwave drying, dehydration by azeotropy with a hydrophobic organic solvent, and high humidity drying by use of high-temperature water vapor. Examples of a dryer for use in such drying include a conductive heat transfer dryer, a radiant heat transfer dryer (e.g., infrared drying), a hot-air heat transfer dryer, a dielectric heating dryer (e.g., microwave drying), and a dryer which uses these dryers in combination. Such drying may be carried out at reduced pressure, and a hot-air heat transfer dryer is preferably used for the drying from the viewpoint of drying efficiency.

For example, the hot-air drying is carried out in a static state, in a stirring state, in a vibrational state, in a fluid state, or by use of an air current. Of these methods, the hot-air drying using fluidized-bed drying or static drying (more preferably ventilation band drying), and still more preferably continuous static drying (continuous ventilation band drying) is used from the viewpoint of efficiency.

Drying is carried out at a temperature (especially a hot-air temperature) normally of 60° C. to 250° C., preferably of 100° C. to 250° C., more preferably of 100° C. to 220° C., still more preferably of 120° C. to 200° C., and particularly preferably of 150° C. to 190° C.

Drying time, which depends on a surface area and/or a water content of a polymer, and a kind and/or an air volume of a dryer, is selected so that a desired water content is obtained. For example, it is only necessary that drying time be appropriately selected in a range of 1 minute to 5 hours or 1 minute to 1 hour.

The drying causes an increase in solid content of the hydrophilic cross-linked polymer preferably to 70 wt % to 95 wt %, more preferably to 80 wt % to 95 wt %, still more preferably to 85 wt % to 95 wt %, and particularly preferably to 90 wt % to 95 wt %.

(2-5) Particle Size Controlling Step

In order to carry out particle size control, the resulting dried product obtained by drying is subjected to pulverization and classification according to need. Such a method is described in, for example, International Publication No. 2004/69915 (U.S. Patent Application Publication No. 2006/024755).

In a case where a particulate water absorbent resin is used for a sanitary material, the particulate water absorbent resin has a weight average particle diameter preferably of 100 μm to 1000 μm, more preferably of 200 μm to 800 μm, and particularly preferably of 300 μm to 600 μm. Further, in a case where the particulate water absorbent resin is used for a sanitary material, the particulate water absorbent resin whose particle size is not less than 150 μm and less than 850 μm has an amount preferably of not less than 80 wt %, and more preferably of not less than 90 wt %. The particulate water absorbent resin is subjected to "(2-6) Surface Treatment Step" described later.

Fine powder which is generated in the step and whose particle size is not more than 150 μm is subjected to classification so as to be removed since the fine powder causes a deterioration in properties of the water absorbent resin and causes a problem in terms of safety and sanitation. Such a step of removing the fine powder by classification may be carried out during or after the heat drying step as described later. The fine powder is appropriately collected and subjected to, for example, a step in which the fine powder is formed to be granular again or collected in a monomer aqueous solution.

Alternatively, the fine powder is subjected to (i) a step in which the fine powder is collected in a polymerizer which controls a particle size, (ii) a step in which the fine powder is collected in a polymerizer and a dryer in the "(2-7) Step of Binding Fine Powder" described later, or (iii) the like.

(2-6) Surface Treatment Step (2-6-1) Surface Cross-Linking Step

A surface cross-linking step is a characteristic part of the present invention. Namely, a method of the present invention for producing a water absorbent resin which method is a method for producing surface cross-linked water absorbent resin particles, the method includes the successive steps of: (a) adding a surface cross-linking agent and water to a particulate water absorbent resin in a mixer; and (b) reacting the resulting water absorbent resin mixture taken out from the mixer with the surface cross-linking agent in a reactor by heating or active energy ray irradiation, water vapor being used as a part or all of the water added in the mixer.

According to the method, it is possible to obtain the surface cross-linked water absorbent resin particles by mixing the surface cross-linking agent and the particulate water absorbent resin and then carrying out heating or active energy ray irradiation so as to promote a reaction between the surface cross-linking agent and a carboxyl group of the particulate water absorbent resin.

The following description specifically discusses how to carry out the present step.

(a) Cross-Linking Agent which can React with Carboxyl Group

The surface cross-linking agent can be exemplified by various organic cross-linking agents or inorganic cross-linking agents in the present invention. For example, publicly-known cross-linking agents mentioned in Patent Literatures 1 through 34 are usable. A surface cross-linking agent which can be used in the present invention is not particularly limited, provided that the surface cross-linking agent can cross-link a water absorbent resin. The techniques for surface cross-linking by polymerizing a monomer (Patent Literatures 20 and 21) and the technique for radical cross-linking by use of persulfate or the like (Patent Literature 22) can also be used or encompassed as cross-linking agents. From the viewpoint of properties and handleability, a surface cross-linking agent can be used which preferably reacts with a carboxyl group (especially a neutralized or unneutralized carboxyl group of polyacrylic acid) of a water absorbent resin, particularly preferably by a covalent bond or an ionic bond, and more preferably by a covalent bond.

The surface cross-linking agent is exemplified by a compound containing a hydroxyl group, an amino group, or a derivative thereof. The surface cross-linking agent is further exemplified by a polyhydric alcohol compound, an epoxy compound, a polyvalent amine compound or a condensate of the polyvalent amine compound and a haloepoxy compound, an oxazoline compound, a mono, di, or polyoxazolidinone compound, a polyvalent metal salt, and an alkylene carbonate compound.

Of these surface cross-linking agents, from the viewpoint of properties (especially a high absorbency against pressure and liquid permeability) and safety, a cross-linking agent (a dehydration reaction cross-linking agent) which can be subjected to a dehydration reaction with the carboxyl group, especially a dehydration reaction cross-linking agent is preferably usable which is selected particularly from a polyhydric alcohol compound (Patent Literature 12), oxazolidinone compounds (Patent Literatures 16 through 18), alkylene carbonate (Patent Literature 19), and oxetane (Patent Literature 11).

Such a dehydration reaction cross-linking agent, which forms a covalent bond with a carboxyl group of a water absorbent resin via a dehydration reaction, does not substantially react by water vapor addition (water addition). Namely, thereafter, a dehydration reaction is carried out by heating or active energy ray irradiation in the reactor with respect to the water absorbent resin mixture taken out from the mixer, so as to provide an excellent water absorbent resin.

A surface cross-linking agent which can be subjected to a dehydration reaction with the carboxyl group is specifically exemplified by compounds mentioned in U.S. patents such as U.S. Pat. No. 6,228,930, U.S. Pat. No. 6,071,976, and U.S. Pat. No. 6,254,990. Examples of the surface cross-linking agent include polyhydric alcohol compounds such as mono, di, tri, tetra, or polyethylene glycol, monopropylene glycol, 1,3-propanediol, dipropylene glycol, 2,3,4-trimethyl-1,3-pentanediol, polypropylene glycol, glycerine, polyglycerine, 2-butene-1,4-diol, 1,4-butanediol, 1,3-butanediol, 1,5-pentanediol, 1,6-hexanediol, and 1,2-cyclohexanedimethanol; epoxy compounds such as ethylene glycol diglycidyl ether and glycidol; polyvalent amine compounds such as ethylenediamine, diethylenetriamine, triethylenetetramine, tetraethylenepentamine, pentaethylenehexamine, polyethyleneimine, and polyamide polyamine; haloepoxy compounds such as epichlorohydrin, epibromhydrin, and α-methylepichlorohydrin; condensates of the polyvalent amine compounds and the haloepoxy compounds; oxazolidinone compounds such as 2-oxazolidinone; alkylene carbonate compounds such as ethylene carbonate; oxetane compounds; and cyclic urea compounds such as 2-imidazolidinone.

Note that polyamine and a polyvalent metal salt are also usable as (i) surface cross-linking agents which can be ionic cross-linked with the carboxyl group of the particulate water absorbent resin and (ii) a liquid permeability enhancers (described later). Such surface cross-linking can be carried out with respect to the particulate water absorbent resin once or a plurality of times by use of an identical or a different surface cross-linking agent.

A preferable surface cross-linking agent is exemplified by dehydration reaction cross-linking agents which are not disclosed in Patent Literature 33, especially polyhydric alcohol, (mono or polyvalent) oxazolidinone, (mono or polyvalent) alkylene carbonate, and (mono or polyvalent) oxetane. In a case where a hydroxyl group or an amino group contained in such a dehydration reaction cross-linking agent or an open circular product of the dehydration reaction cross-linking agent is subjected to a dehydration reaction with a carboxyl group of a water absorbent resin, so as to cross-link the water absorbent resin, it is possible to enhance AAP and SFC which are not disclosed in Patent Literature 33. In a case where water vapor is used to add water and the dehydration reaction cross-linking agent is preferably added to the particulate water absorbent resin as a solution, especially as an aqueous solution, it is possible to enhance AAP and SFC which are not disclosed in Patent Literature 33.

Namely, in a case where a dehydration reaction is carried out in a heat treatment in which an aqueous solution is used to add water and a cross-linking agent, especially a dehydration reaction cross-linking agent is preferably added to a water absorbent resin as a solution, especially as an aqueous solution, it is possible to enhance AAP and SFC. Since a dehydration reaction hardly progresses (or does not progress at all) in the presence of water, a decrease in water content (synonym: an increase in solid content) of water absorbent resin particles before and after surface cross-linking makes it possible to easily check how dehydration progresses. How the dehydration reaction progresses can be checked by use of a decrease in water contained in water absorbent resin particles after surface cross-linking, especially to not more than 3 wt %, not more than 2 wt %, not more than 1 wt %, and not more than 0.5 wt %, as compared to the particulate water absorbent resin to which the surface cross-linking agent (aqueous solution) has not been added. In order to avoid uneven surface cross-linking due to use of an aqueous solution, Patent Literature 33 discloses the techniques for (i) using water vapor and (ii) causing water vapor to increase a weight of a water absorbent resin (to 0.7 part by weight, especially to 0.02 part by weight to 0.1 part by weight). However, Patent Literature 33 does not disclose use of liquid water, and a dehydration reaction and a water content obtained after the dehydration reaction. According to the present invention, it is preferable that a water content of the water absorbent resin particles be reduced before and after surface cross-linking by removing added water or water vapor during the dehydration reaction.

It is preferable that the surface cross-linking agent be used in an amount preferably of 0.001 part by weight to 10 parts by weight, and more preferably of 0.01 part by weight to 5 parts by weight, with respect to 100 parts by weight of the particulate water absorbent resin, though depending on compounds to be used, a combination thereof, and the like.

Water is used in the present invention in addition to the surface cross-linking agent. In this case, water is used in an amount preferably of 0.5 part by weight to 20 parts by weight, and more preferably of 0.5 part by weight to 10 parts by weight, with respect to 100 parts by weight of the particulate water absorbent resin. Besides water, a hydrophilic organic solvent is also usable for the present invention. In this case, the hydrophilic organic solvent is used in an amount of more than 0 part by weight and not more than 10 parts by weight, and preferably of more than 0 part by weight and not more than 5 parts by weight, with respect to 100 parts by weight of the particulate water absorbent resin.

Examples of the hydrophilic organic solvent include lower alcohols such as methyl alcohol, ethyl alcohol, n-propyl alcohol, isopropyl alcohol, n-butyl alcohol, isobutyl alcohol, and t-butyl alcohol; ketones such as acetone; ethers such as dioxane, tetrahydrofuran, and methoxy(poly)ethylene glycol; amides such as ∈-caprolactam and N,N-dimethylformamide; sulfoxides such as dimethyl sulfoxide; and polyhydric alcohols such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerine, polyglycerine, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, an oxyethylene-oxypropylene block copolymer, pentaerythritol, and sorbitol.

Note that such a polyhydric alcohol may be used as a cross-linking agent by appropriately selecting a temperature and time or may be used as a solvent without being subjected to any reaction. Alternatively, a plurality of polyhydric alcohols having their respective properties may be used in combination. In view of mixing property, these solutions including water are used at a temperature of 0° C. to 100° C., and preferably of 5° C. to 50° C., though depending on a freezing point and a boiling point.

In a case where a cross-linking agent solution is mixed with the particulate water absorbent resin, water-insoluble fine particle powder and a surfactant may coexist with the cross-linking agent solution for example, in an amount of more than 0 wt % and not more than 10 wt %, preferably of more than 0 wt % and not more than 5 wt %, and more preferably of more than 0 wt % and not more than 1 wt %, provided that the coexistence does not impair the effect of the present invention. For example, U.S. Pat. No. 7,381,775 mentions a preferable surfactant and how to use the preferable surfactant. Further, water vapor may be poured into a mixing vessel simultaneously with the coexistence. These surface cross-linking agents are favorably mixed by the mixing method of the present invention.

(b) Particulate Water Absorbent Resin to be Supplied to Surface Cross-Linking Step The particulate water absorbent resin which has been subjected to the "(2-5) Particle Size Controlling Step" is temporarily stored in a storage facility which is heated or kept warm. Then, the particulate water absorbent resin is quantitatively supplied to the surface cross-linking step by a feeder. A preferable feeder is a circle feeder or a screw feeder.

The particulate water absorbent resin to be supplied to the mixer preferably has a temperature which is lower than that of water vapor, more preferably by 10° C. to 100° C., still more preferably by 30° C. to 90° C., and particularly preferably by 50° C. to 80° C.

When placed in the mixer, the particulate water absorbent resin to be supplied to the surface cross-linking step preliminarily has a temperature preferably of 30° C. to 150° C., more preferably of 40° C. to 120° C., still more preferably of 30° C. to 90° C., particularly preferably of 40° C. to 80° C., and most preferably of 50° C. to 70° C. Adhesion and agglomeration easily occur in a water absorbent resin. In a case where the particulate water absorbent resin to be placed has a temperature of less than 30° C., adhesion easily occurs and blocking may occur in long-time operation due to, for example, growth of an adhered product. In contrast, in a case where the particulate water absorbent resin to be placed has a temperature of more than 150° C., the particulate water absorbent resin may deteriorate and mixing property of the particulate water absorbent resin may deteriorate depending on an additive.

In a case where a temperature of the particulate water absorbent resin is set to be lower than that of water vapor, water is efficiently absorbed in the particulate water absorbent resin. However, in a case where the temperature of the particulate water absorbent resin is excessively lower than that of water vapor by, for example, not less than 110° C., and further by not less than 150° C., such temperature setting causes agglomeration of the particulate water absorbent resin and may be disadvantageous in carrying out the subsequent heat treatment, i.e., the dehydration reaction carried out by heating in the reactor with respect to the water absorbent resin mixture taken out from the mixer.

Note that, though it is assumed that setting the temperature of the particulate water absorbent resin to be low causes water vapor to form dew on a surface of the particulate water absorbent resin and promotes addition of water evenly to the particulate water absorbent resin, it does not particularly matter whether addition of water to the particulate water absorbent resin is direct absorption of water vapor or absorption of condensate of water vapor.

The temperature of the particulate water absorbent resin can be measured by taking out the particulate water absorbent resin to be placed in the mixer and immediately causes the particulate water absorbent resin to be in contact with a common contact-type thermometer.

(c) Water Vapor

A first method of the present invention for producing a water absorbent resin is to supply water vapor to the mixer. Saturated water vapor whose vapor pressure is preferably higher than a normal atmospheric pressure is supplied to the mixer via a vapor line. In a case where saturated water vapor has a vapor pressure higher than the normal atmospheric pressure, an apparatus such as a blower for supplying gas is unnecessary. This makes it possible to supply water vapor efficiently.

Water vapor (preferably saturated water vapor) to be supplied to the mixer has a vapor pressure (gauge pressure) preferably of 0.01 MPa to 1 MPa, more preferably of 0.05 MPa to 0.9 MPa, and still more preferably of 0.1 MPa to 0.8 MPa. Water vapor which has a vapor pressure of less than 0.01 MPa causes a deterioration in mixing property. In contrast, water vapor which has a vapor pressure of more than 1 MPa causes high-pressure vapor to be unconfined in the mixer and is therefore dangerous. Further, water vapor which has a high temperature may cause a deterioration in polymer.

Note that a vapor pressure of saturated water vapor can be read as a temperature of saturated water vapor by use of, for example, a table described in page 400 of Chemical Engineering Handbook Sixth Edition (published by Maruzen Company, Limited.). A preferable temperature of water vapor is approximately 100° C. to 180° C. A dew point of the mixer is preferably 60° C. to 100° C., more preferably 70° C. to 100° C., and particularly preferably 80° C. to 100° C. In a case where the dew point of the mixer is less than 60° C., the effect of the present invention is less powerful.

(d) Mixer

According to the present invention, after the surface cross-linking agent is added to the particulate water absorbent resin in the mixer so as to mix the surface cross-linking agent and the particulate water absorbent resin, heating or active energy ray irradiation is carried out to cause a reaction between the surface cross-linking agent and the particulate water absorbent resin.

The reactor for causing the reaction between the surface cross-linking agent and the particulate water absorbent resin may be identical in type to or different in type from an apparatus for mixing the surface cross-linking agent and the particulate water absorbent resin. However, since the mixer is required to mix the particulate water absorbent resin and the surface cross-linking agent immediately, the mixer is less likely to have an apparatus structure such that heating or active energy ray irradiation is carried out long enough to promote a cross-linking reaction. Accordingly, it is preferable that the mixer and the reactor be different in type.

Namely, a continuous apparatus (an apparatus carrying out steps continuously) is preferable in which a mixer and a reactor are connected. The particulate water absorbent resin resides in the mixer preferably for not less than 1 second and less than 5 minutes, and more preferably for not less than 1 second and less than 1 minute on average. Average time for which the water absorbent resin mixture resides in the reactor to which the mixer is connected is appropriately determined by, for example, reactivity of a cross-linking agent. For example, the average time is not less than 1 minute, normally 6 minutes to 10 hours, and further 10 minutes to 2 hours.

It is preferable that a mixing apparatus used to mix the particulate water absorbent resin and the surface cross-linking agent have great mixing power so that these substances are mixed evenly without fail.

Preferable examples of the mixing apparatus include a cylindrical mixer, a double-wall conical mixer, a high-speed stirring mixer, a V-shaped mixer, a ribbon mixer, a screw mixer, a dual-arm kneader, a pulverizing kneader, a rotary mixer, an air mixer, Turbulizer, a batch Lödige mixer, and a continuous Lödige mixer. A more preferable mixer for the present invention is a vertical mixer which has a cylindrical mixing vessel and in which a paddle rotates about a central shaft.

Note that the vertical mixer is a mixer whose revolving shaft is in a vertical direction and a horizontal mixer is a mixer whose revolving shaft is in a horizontal direction. In the horizontal mixer, a moist water absorbent resin easily accumulates in a lower part of a mixing vessel. This produces a large agglomerate of the water absorbent resin and causes adhesion of the water absorbent resin to a puddle, so that mixing property may deteriorate.

From the above viewpoint, the present invention is preferably arranged such that a vertical mixing apparatus which meets the following requirements (i) through (iii) is used to mix the particulate water absorbent resin and an additive such as the surface cross-linking agent.

(i) at least one stirring vane revolves at 300 rpm to 3000 rpm;

(ii) a revolving shaft of the at least one stirring vane is in a vertical direction; and (iii) a mixing vessel is vertically divided into two or more rooms by a partition whose aperture ratio is 5% to 70%.

In order to solve the problems, the inventors of the present invention carried out various studies. As a result, the inventors concluded that only a stirring vane cannot prevent the particulate water absorbent resin from passing straight through a conventional vertical mixer, i.e., a mixer whose revolving shaft is in a vertical direction and considered providing a partition for a mixing vessel, so that the vertical mixing apparatus was accomplished.

Namely, the present invention provides a second method for producing a water absorbent resin which method is arranged such that: in the step of mixing a particulate water absorbent resin and an additive, a temperature of the particulate water absorbent resin is preset to 30° C. to 150° C.; and a continuous mixing apparatus is used which meets the following requirements (i) through (iii): (i) at least one stirring vane revolves at 300 rpm to 3000 rpm; (ii) a revolving shaft of the at least one stirring vane is in a vertical direction; and (iii) a mixing vessel is vertically divided into two or more rooms by a partition whose aperture ratio is 5% to 70%.

According to the method, it is possible to evenly mix the particulate water absorbent resin and the additive, and the resulting mixture has preferable properties according to an object of the additive. Further, the method is also suitable for producing a water absorbent resin in a scale of more than 1 t/hr. Namely, mixing of the particulate water absorbent resin and the additive by use of the method realizes high mixing property, a high throughput, and stable operability.

The following description specifically discusses a mixing system of the vertical mixer and a preferable mixing condition.

The mixing vessel of the vertical mixer is preferably drum-shaped and has the revolving shaft of the at least one stirring vane at its center. A body of such a mixing vessel may be swollen or constricted provided that the present invention is not impaired.

The particulate water absorbent resin placed in the vertical mixer is discharged after being subjected to the following two processes: (I) dispersion and (II) mixing by stirring.

In the (I) dispersion process, an air current caused by the at least one stirring vane and its rotation allows the particulate water absorbent resin to have a centrifugal force, so that the particulate water absorbent resin is dispersed toward a side wall of the vertical mixer. The at least one stirring vane of the vertical mixer revolves at 300 rpm to 3000 rpm, and preferably at 500 rpm to 3000 rpm. A maximum rotation diameter of the at least one stirring vane is normally approximately 0.1 m to 1 m, and a diameter of the mixing vessel is normally approximately 0.15 m to 1.2 m. In a case where the at least one stirring vane of the vertical mixer revolves at less than 300 rpm, it is impossible to obtain an air current enough for the particulate water absorbent resin to be dispersed. In a case where the at least one stirring vane of the vertical mixer revolves at more than 3000 rpm, a collision between the water absorbent resin and the at least one stirring vane damages the water absorbent resin. This may cause problems of a deterioration in properties and an increase in fine powder.

The revolving shaft of the at least one stirring vane is in a vertical direction. However, the revolving shaft does not need to be in a precisely vertical direction, and may be inclined provided that the inclination does not impede operation of the mixer. The number of revolving shafts may be set to 1 to 5 and is normally 1.

The particulate water absorbent resin is placed in the mixing vessel via an inlet provided in an upper surface of the mixing vessel. In this case, a partition is provided so as to prevent the particulate water absorbent resin from falling toward an outlet before being sufficiently dispersed. It is preferable that the partition be provided under the inlet.

The partition of the continuous mixing apparatus has an aperture ratio of 5% to 70%, preferably of 10% to 50%, and particularly preferably of 10% to 30%. The aperture ratio is a value which can be found based on the following equation by use of an area (S1) and an area (S2) in a plane (a horizontal plane in the present invention) which is at right angles to the revolving shaft, the area (S1) being an area of an interior defined by an inner wall of a casing, the area (S2) being an area of a structure provided in the interior defined by the inner wall of the casing and a hollow part (e.g., a hollow of an interior of a revolving shaft) of an interior of the structure which part the particulate water absorbent resin cannot enter.

$$\text{Aperture ratio (\%)} = (S1(\text{cm}^2) - S2(\text{cm}^2))/S1(\text{cm}^2) \times 100 \quad [\text{Math. 1}]$$

In a case where the partition has an aperture ratio of less than 5%, blocking easily occurs. In a case where the partition has an aperture ratio of more than 70%, the particulate water absorbent resin easily passes straight through the mixer. These cases are likely to cause a deterioration in mixing property. Note that a shape, a location, and the like of an aperture are appropriately determined. The number of apertures may be one or more. Preferably 1 to 5 apertures, and more preferably 1 to 3 apertures are provided in an outer circumferential part of the revolving shaft, especially around the inner wall. A preferable aperture has a partitioning structure described later. It is preferable that such a partition be made of a board, especially a disk whose area is S2 and be a vertical partition having an aperture whose area is (S1-S2).

One aperture, which needs to be larger than the water absorbent resin, has an area which is preferably 2 times or more, and more preferably 10 times or more, and 100 times or more a cross-sectional area of the weight average particle diameter (D50), and/or has a cross-sectional area of not less than 1 cm$^2$, and more preferably of not less than 5 cm$^2$. An upper limit of the area of the aperture is not more than 6000 cm$^2$, and normally approximately 1000 cm$^2$, the upper limit being appropriately determined depending on a throughput.

The number of partitions is one or more. Two or more partitions may be provided vertically, so that the mixing vessel is vertically divided into two or more rooms. It is preferable that each of the rooms have a volume which is not less than 10% of that of the mixing vessel. How to divide the mixing vessel can be appropriately selected in this range.

The partition may be a fixed partition provided in a side wall of the mixing vessel. Alternatively, a partition which rotates about the revolving shaft of the at least one stirring vane may be used as the partition. According to this method, even a large partition causes adhesion to be less likely to occur due to a centrifugal force. Such a partition may be obtained by, for example, providing the revolving shaft with a plate structure or partially thickening the revolving shaft. Alternatively, such a partition may be integrated into the at least one stirring vane. Namely, the at least one stirring vane can be provided not for the revolving shaft but for the partition.

The additive which is mixed in the continuous mixing apparatus is in a state of a liquid, a dispersion liquid, or solid fine particles. In a case where the additive is a liquid or a dispersion, the mixer for use in the present invention yields a particularly great effect especially in terms of prevention of adhesion and the like. Even in a case where the additive is solid fine particles, favorable mixing property is not impaired. The solid fine particles, which are mixed immediately, cause less damage to the particulate water absorbent resin.

The additive is used in an amount preferably of not more than 100 parts by weight, more preferably of not more than 70 parts by weight, and preferably of not less than 0.0001 part by weight with respect to 100 parts by weight of the particulate water absorbent resin, though depending on for what the additive is used and/or in what state the additive is.

The additive is added by drop or spray. In order to allow the additive to be evenly mixed with the water absorbent resin, the additive is added preferably by spray. However, in a case where the at least one stirring vane and the air current cause a liquid drop to be foggy, the additive and the water absorbent resin can be mixed sufficiently even by drop. The additive is added preferably in the middle of the "(I) dispersion" process or after the "(I) dispersion" process.

The particulate water absorbent resin to which the additive has been adhered is subjected to the "(II) mixing by stirring" process. In the continuous mixing apparatus, a large partition divides regions in which "(I) dispersion" and "(II) mixing by stirring" are respectively carried out, so as to prevent the particulate water absorbent resin from passing straight through the continuous mixing apparatus. A plurality of such partitions may be provided. A partition is provided preferably between a stirring vane and another stirring vane.

In the "(II) mixing" process, the particulate water absorbent resin to which the additive has been adhered forms a residence layer while rotating along the side wall by a centrifugal force. The at least one stirring vane passing through the residence layer causes intense mixing of the particulate water absorbent resin and the additive, so that the particulate water absorbent resin and the additive are mixed evenly. In a case where fine powder and a binding agent are mixed, the fine powder is further bound in this process, so that a bound product whose particle size is not less than 150 μm is formed.

As described earlier, in order to cause the particulate water absorbent resin to reside in the side wall by the centrifugal force and to carry out stirring, it is preferable to provide an outlet closer to the revolving shaft than to an orbit made by a tip of the at least one stirring vane. In order to control a residence amount for enhancing properties, it is more preferable to provide the outlet with a dam structure whose length and/or an angle can be changed.

A length ($\alpha$) in a horizontal direction from the side wall (inner wall) toward the revolving shaft of the dam structure is preferably 1% to 40% of a maximum radius of the mixing vessel (a maximum radius of the interior defined by the inner wall of the casing in the plane (horizontal plane in the present invention)) which is at right angles to the revolving shaft), and an angle ($\beta$) made by the dam structure with respect to the horizontal plane is preferably 10° to 80°. In a case where the angle is more than 80° or the length is less than 1% of the maximum radius of the mixing vessel, the particulate water absorbent resin forms no residence layer and may cause a deterioration in mixing property. In contrast, in a case where the angle is less than 10° or the length is more than 40% of the maximum radius of the mixing vessel, discharging property may deteriorate.

Since each of the mixing methods of the present invention is directed to cause the particulate water absorbent resin to be less likely to pass straight through the mixer or unnecessarily reside in the mixer, the mixing vessel may have a low height in the revolving shaft direction. Assuming that a height of the mixing vessel in the revolving shaft direction is H and a diameter of a maximum part of the mixing vessel (a maximum diameter (a maximum diameter of the interior defined by the inner wall of the casing in the plane (horizontal plane in the present invention) which is at right angles to the revolving shaft)) is D, a value of H/D is preferably 0.1 to 1.0, and particularly preferably 0.1 to 0.5.

Note that the mixing vessel preferably has a maximum diameter of 0.15 m to 1.2 m and a height of 0.03 m to 1 m. Accordingly, though the mixer is unconventional and highly compact in shape, the mixer mixes the particulate water absorbent resin with a high throughput preferably of 10 kg/hr to 300 kg/hr, and more preferably of 10 kg/hr to 150 kg/hr per liter of the volume of the mixing vessel of the mixer. In this case, a throughput for each mixer is preferably 50 kg/hr to 30000 kg/hr, though depending on a size of the mixer.

It is preferable that the inner wall of the mixer of the present invention be heated or kept warm. The inner wall includes an inner surface of a casing, a shaft, a partition, and a stirring vane. The mixer may be heated by, for example, letting a jacket of the mixer through water vapor or warm water. Alternatively, it is also preferable that the mixer be heated by installing a pipe for water vapor or warm water in an interior of the shaft or the partition. The inner wall preferably has a temperature of 50° C. to 150° C. In a case where the inner wall has a temperature of less than 50° C., some additives may be adhered to the inner wall. In a case where the inner wall has a temperature of more than 150° C., the particulate water absorbent resin may deteriorate.

In order to prevent adhesion, it is also preferable that the inner wall of the mixer of the present invention be covered with a material which causes adhesion to be less likely to occur. For example, it is possible to cover the inner wall by use of a material (base material) which is in contact with water at an angle of not less than 60°. For example, fluororesin is usable as such a material. The continuous mixing apparatus, which is compact, is easy to cover. The continuous mixing apparatus is particularly advantageous in that the side wall which is severely worn due to a friction with the particulate water absorbent resin has a small area since the continuous mixing apparatus can be shortened in the revolving shaft direction.

Water vapor can be introduced also in the continuous mixing apparatus so as to mix the particulate water absorbent resin and the additive. Introduction of water vapor may prevent adhesion of the particulate water absorbent resin to the inner wall and allow control of liquid permeability of the additive. Especially when fine powder and a binding agent are mixed, introduction of water vapor is preferable since the water vapor becomes water on a surface of the fine powder and has an effect of binding the fine powder.

It is preferable that the water vapor to be supplied to the mixer be saturated water vapor and be unconfined in the mixer. The water vapor has a gauge pressure of 0.1 MPa to 2.0 MPa, preferably of 0.1 MPa to 1.0 MPa, and more preferably of 0.1 MPa to 0.5 MPa. In a case where the water vapor has a gauge pressure of less than 0.1 MPa, the water vapor is ineffective. In a case where the water vapor has a gauge pressure of more than 2.0 MPa, the particulate water absorbent resin may deteriorate.

The water vapor is supplied in an amount of 1 kg/hr to 100 kg/hr, preferably 1 kg/hr to 50 kg/hr, and more preferably 1 kg/hr to 30 kg/hr with respect to 100 kg/hr of the particulate water absorbent resin. In a case where the water vapor is supplied in an amount of less than 1 kg/hr with respect to 100 kg/hr of the particulate water absorbent resin, the water vapor is ineffective. In a case where the water vapor is supplied in an amount of more than 100 kg/hr with respect to 100 kg/hr of the particulate water absorbent resin, a mixed state may deteriorate. Note that only a part of the water to be supplied to the mixer is absorbed in the particulate water absorbent resin. Since adhesion is less likely to occur when water vapor is introduced in the mixer which is a characteristic of the present invention, the mixer is suitable for mixing in which water vapor is introduced.

The paddle of the mixer revolves preferably at not less than 100 rpm and less than 5000 rpm, and more preferably at not less than 300 rpm and less than 2000 rpm. In a case where the paddle revolves at less than 100 rpm, an agglomerate of the water absorbent resin is easily produced in the mixing vessel. In contrast, in a case where the paddle revolves at not less than 5000 rpm, a collision between the paddle and the water absorbent resin may pulverize the water absorbent resin.

The particulate water absorbent resin resides in the mixer preferably for not less than 1 second and less than 5 minutes, and more preferably for not less than 1 second and less than 1 minute. In a case where the particulate water absorbent resin resides in the mixer for less than 1 second, mixing is insufficient, and a deterioration may occur in properties such as an absorbency against pressure of the particulate water absorbent resin which has been surface cross-linked. In contrast, in a case where the particulate water absorbent resin resides in the mixer for not less than 5 minutes, the collision between the paddle and the water absorbent resin may damage the water absorbent resin and cause a deterioration in properties of the particulate water absorbent resin which has been surface cross-linked.

Note that it is preferable that an exhauster be provided between the mixer and an inlet of the reactor. The mixer preferably has an exhauster. More preferably, the mixer has an exhauster in a vicinity of the outlet via which the water absorbent resin which has been subjected to the mixing is discharged. The exhauster is provided to prevent residence of excess water vapor. Therefore, the exhauster is preferably kept warm or warmed.

An exhaust line has a pressure (an exhaust pressure) preferably of −0.01 kPa (gauge pressure) to −1 kPa, and more preferably of −0.05 kPa to −0.5 kPa. In a case the exhaust line has an exhaust pressure of less than −0.01 kPa, the water absorbent resin easily produces a large agglomerate. In contrast, in a case where the exhaust line has an exhaust pressure of more than −1 kPa, the water absorbent resin enters the exhaust line, so that a loss may occur and/or the exhauster may have a lower capacity.

An inner surface (e.g., the inner wall and a stirring blade provided according to need) of the mixer preferably has a lower temperature than water vapor, more preferably by 10° C. to 100° C., still more preferably by 30° C. to 90° C., and particularly preferably by 50° C. to 80° C.

In a case where the temperature of the inner surface of the mixer is set to be lower than that of water vapor, water is efficiently absorbed in the particulate water absorbent resin. Further, such temperature setting yields an effect of preventing adhesion of the particulate water absorbent resin. This seems to be because water vapor condenses in the inner wall of the mixer to form a water layer, so that the inner wall and the particulate water absorbent resin are prevented from being in direct contact with each other.

However, in a case where the mixer has an excessively lower temperature than water vapor by, for example, not less than 110° C., and further by not less than 150° C., such temperature setting causes agglomeration of the particulate water absorbent resin and may be disadvantageous in carrying out the subsequent heat treatment, i.e., the dehydration reaction carried out by heating in the reactor with respect to the water absorbent resin mixture taken out from the mixer.

Note that it is assumed that setting the temperature of the mixer to be low causes water vapor to form dew on the inner surface of the mixer and the particulate water absorbent resin and the inner surface on which dew has been formed are in contact with each other, so as to promote addition of water evenly to the particulate water absorbent resin. However, it does not particularly matter in the present embodiment whether addition of water to the particulate water absorbent resin is direct absorption of water vapor or absorption of condensate of water vapor.

The following description discusses a specific example of the vertical mixing apparatus described above with reference to FIGS. 1 through 3.

Figure 2:
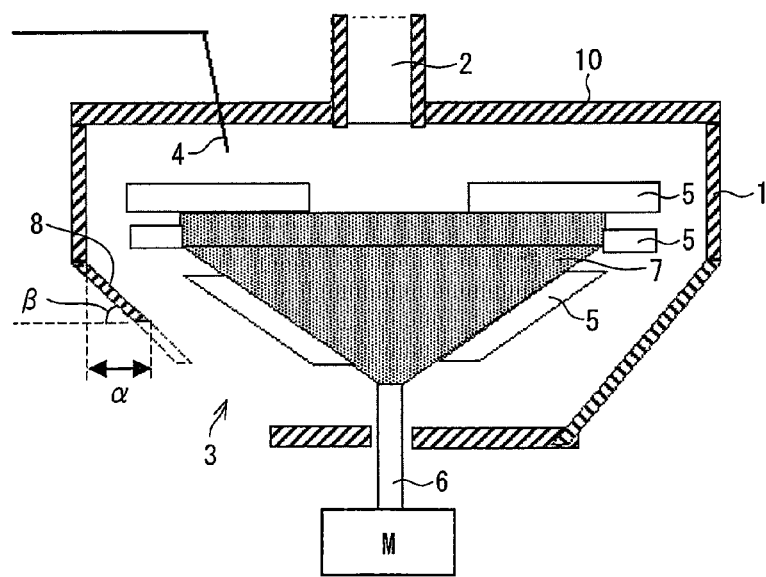
FIG. 2 is a cross-sectional view schematically illustrating an arrangement of another example of the mixer which is usable for the method in accordance with the present embodiment.
Figure 3:
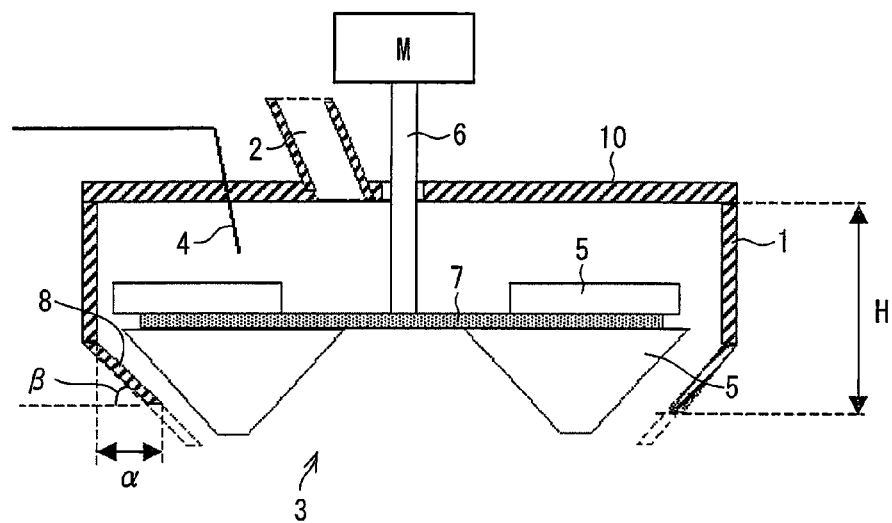
FIG. 3 is a cross-sectional view schematically illustrating an arrangement of still another example of the mixer which is usable for the method in accordance with the present embodiment.

FIG. 1 is a cross-sectional view schematically illustrating an arrangement of an example of a vertical mixing apparatus in accordance with the present embodiment. FIG. 2 is a cross-sectional view schematically illustrating an arrangement of another example of the vertical mixing apparatus in accordance with the present embodiment. FIG. 3 is a cross-sectional view schematically illustrating an arrangement of still another example of the vertical mixing apparatus in accordance with the present embodiment.

The vertical mixing apparatus in accordance with the present embodiment includes, in a mixing layer 10, a revolving shaft 6 provided in a vertical direction for stirring, stirring vanes 5 provided for the revolving shaft 6, and a plate-like partition 7 which vertically divides the mixing layer 10 into two or more rooms and is provided in a side wall 1 of the mixing layer 10 (see FIG. 1).

An inlet 2 via which the water absorbent resin particles are poured and an additive inlet 4 via which a surface cross-linking agent is poured are provided in an upper part of the mixing layer 10. An outlet 3 via which a mixture of the particulate water absorbent resin and the additive is discharged is provided in a lower part of the mixing layer 10. The outlet 3 allows a dam 8 to change a size thereof.

Such a structure allows mixing of (i) the particulate water absorbent resin to be supplied via the inlet 2 and (ii) the additive such as a surface cross-linking agent supplied via the additive inlet 4 in the mixing layer 10. Note here that, since the mixing layer 10 is vertically divided into two rooms by the partition 7, the particulate water absorbent resin is prevented from falling toward the outlet before being mixed sufficiently. The mixture in which the particulate water absorbent resin and the additive have been mixed sufficiently is discharged via the outlet 3.

According to the vertical mixing apparatus illustrated in FIG. 1, the partition 7 is provided on the side wall 1. A partition 7 may be provided for a stirring axis 6 and rotate about revolving shafts of stirring vanes 5 (see FIGS. 2 and 3). Note that according to the arrangements illustrated in FIGS. 2 and 3, the stirring vanes 5 are provided for the partition 7.

(e) Amount of Water to be Supplied

An increase in amount of water contained in the particulate water absorbent resin is a sum of (i) an amount of water supplied to the mixer as liquid water and absorbed in the particulate water absorbent resin and (ii) an amount of water supplied to the mixer as water vapor and absorbed in the particulate water absorbent resin. Note that it does not particularly matter in the present invention whether water supplied to the mixer as water vapor and absorbed in the particulate water absorbent resin is obtained by direct absorption of water vapor or absorption of condensate of water vapor.

An amount of water supplied to the mixer as water vapor and absorbed in the particulate water absorbent resin may be calculated assuming that normally 100% of water to be supplied to the mixer as liquid water is absorbed in the particulate water absorbent resin. Namely, it is assumed in the present invention that an amount of water supplied to the mixer as water vapor and absorbed in the particulate water absorbent resin is obtained by subtracting an amount of water supplied to the mixer as liquid water from an increase in amount of water contained in the particulate water absorbent resin.

An amount of water absorbed in the particulate water absorbent resin as liquid water is preferably 0.5 part by weight to 20 parts by weight, and more preferably 0.5 part by weight to 10 parts by weight with respect to 100 parts by weight of the particulate water absorbent resin. In contrast, an amount of water absorbed in the particulate water absorbent resin as water vapor is 0.1 part by weight to 10 parts by weight, and more preferably 0.5 part by weight to 5 parts by weight with respect to 100 parts by weight of the particulate water absorbent resin.

In a case where an increase in amount of water due to absorption of water is less than 0.1 part by weight, the effect of the present invention is less powerful. In contrast, in a case where an increase in amount of water due to absorption of water is more than 10 parts by weight, many agglomerates of the particulate water absorbent resin are produced and it may be difficult for the mixer to operate stably. Since not all the water vapor to be supplied to the mixer is absorbed in the particulate water absorbent resin, it is necessary to supply, to the mixer, water vapor which is preferably 1.1 times to 5 times, and more preferably 1.5 times to 3 times an amount of water absorbed in the particulate water absorbent resin. An amount of water vapor supplied to the mixer can be measured by use of a commercially available flow meter.

Namely, the present invention is preferably arranged such that liquid water and water vapor are used in combination to form water to be added to the particulate water absorbent resin. In this case, liquid water may contain only water or a mixture of water and an organic solvent. From the viewpoint of properties, a surface cross-linking agent aqueous solution and water vapor are used in combination to form water added to the particulate water absorbent resin.

0.1 part by weight to 10 parts by weight of water is mixed with 100 parts by weight of the particulate water absorbent resin, and an amount of water supplied as liquid water is preferably 0 wt % to 95 wt %, more preferably 20 wt % to 90 wt %, and particularly preferably 40 wt % to 80 wt % of the whole supplied water.

Note that the techniques have been proposed for using water vapor for a heat reaction in a heat treatment carried out with respect to a water absorbent resin mixture with which a monomer and a surface cross-linking agent have been mixed (see Patent Literatures 20, 21, 33, and 34) and a technique has also been proposed for using water vapor to granulate a water absorbent resin (see Japanese Patent Application Publication, Tokukai, No. 2005-054151 A). In contrast, the present invention uses water vapor, preferably water vapor and liquid water (especially a cross-linking agent aqueous solution) to mix the surface cross-linking agent with the water absorbent resin, so that the water absorbent resin having high properties was made.

(f) Step of Causing Surface Cross-Linking Agent to React

The water absorbent resin mixture in which the surface cross-linking agent has been mixed with the water absorbent resin is subjected to heating or active energy ray irradiation in the reactor. The water absorbent resin mixture is preferably subjected to the heat treatment and then a cooling treatment according to need. The water absorbent resin mixture is heated preferably at 70° C. to 300° C., more preferably at 120° C. to 250° C., and still more preferably at 150° C. to 250° C. The water absorbent resin mixture is heated preferably for not less than 1 minute, normally for 6 minutes to 10 hours, and more preferably for 10 minutes to 2 hours.

The heat treatment can be carried out by use of a normal dryer or a heating oven. Preferably, use of a paddle-equipped dryer can prevent agglomerate formation and heat unevenness. In a case where a polymerizable or radical reaction surface cross-linking agent is used (see Patent Literatures 20 through 22, for example), heating or active energy ray irradiation may be carried out in the reactor.

(g) Amount of Production

In a case where the surface cross-linking method of the present invention is used in a small scale or in a batch reaction, the effect of the invention may be less powerful. The surface cross-linking method is suitably usable for continuous production in a continuous enormous scale normally of not less than 0.1 [t/hr], preferably of 1 [t/hr], and more preferably of 2 [t/hr] to 100 [t/hr].

(h) Temperature Increase (Second Method for Producing Water Absorbent Resin)

Assuming that the addition of water vapor is an example of means for attaining the present invention, the present invention is preferably arranged such that in the step of adding water and the surface cross-linking agent in the mixer, a temperature of the resulting water absorbent resin mixture (in which normally, 0.001 part by weight to 10 parts by weight of the surface cross-linking agent and 0.5 part by weight to 10 parts by weight of water are mixed with 100 parts by weight of the particulate water absorbent resin) is increased preferably by not less than 2° C., more preferably by 3° C. to 60° C., 4° C. to 50° C., 5° C. to 40° C., and 6° C. to 30° C. with respect to a temperature of the particulate water absorbent resin.

Such temperature control is carried out by controlling an amount of water vapor added, time for which the particulate water absorbent resin resides in the mixer, and/or a temperature of the inner wall of the mixer. Preferably, as in the case of the first method for producing a water absorbent resin, water vapor is supplied to the mixer and the inner wall of the mixer is heated in the range described above. The water absorbent resin mixture taken out from the mixer has a temperature preferably of 50° C. to 140° C., more preferably of 60° C. to 110° C., and particularly preferably of 70° C. to 95° C., though depending on a temperature of the particulate water absorbent resin which has not been subjected to the mixing.

In a case where a temperature of the water absorbent resin mixture is increased in the step of adding the surface cross-linking agent and water in the mixer, it seems that permeation and diffusion of the surface cross-linking agent to a surface of the water absorbent resin are promoted and optimized. Therefore, the present invention is advantageous in that more excellent properties are obtained than before and subsequent reaction time is reduced, so that energy conservation is realized.

Namely, the present invention also provides a second method for producing a water absorbent resin which method is a method for producing surface cross-linked water absorbent resin particles, the method including the successive steps of: (a) adding a surface cross-linking agent and water to a particulate water absorbent resin in a mixer; and (b) reacting the resulting water absorbent resin mixture taken out from the mixer with the surface cross-linking agent in a reactor by heating or active energy ray irradiation, in the step (a), the resulting water absorbent resin mixture being increased in temperature by not less than 2° C. as compared to the particulate water absorbent resin. The temperature is increased preferably by use of water vapor. Alternatively, the temperature may be increased by controlling a temperature of the inner wall of the mixer and/or time for which the particulate water absorbent resin resides in the mixer.

Another embodiment of the surface cross-linking treatment of the present invention is exemplified by a method in which a process liquid containing a radial polymerizable compound is added to the particulate water absorbent resin and then the resulting water absorbent resin mixture is subjected to the surface cross-linking treatment by active energy ray irradiation. Such a method is described in, for example, Japanese Patent Application Tokugan, No. 2003-303306 (U.S. Pat. No. 7,201,941). Further, the surface cross-linking treatment can be carried out by active energy ray irradiation after adding a surfactant to the process liquid.

Still another embodiment of the surface cross-linking treatment of the present invention is exemplified by a method in which an aqueous liquid containing a peroxide radical initiator is added to the particulate water absorbent resin and then the resulting water absorbent resin mixture is heated to be subjected to the surface cross-linking treatment. Such a method is described in, for example, Japanese Examined Patent Application Publication Tokukohei No. 07-8883 (U.S. Pat. No. 4,783,510).

(2-6-2) Liquid Permeability Enhancer

It is preferable that a liquid permeability enhancer be further added to the water absorbent resin particles obtained by the method of the present invention for producing a water absorbent resin simultaneously with or after surface cross-linking. The addition of the liquid permeability enhancer makes a more noticeable difference from a conventional technique and clarifies the present invention. The addition of the liquid permeability enhancer causes the water absorbent resin particles to have a liquid permeability enhancer layer. This allows the water absorbent resin particles to have more excellent liquid permeability.

It is possible to further add, to the particulate water absorbent resin, other functionality giving agents such as a deodorant agent, a color protector, an antibacterial agent, or an antiblocking agent simultaneously or in another step.

Examples of the liquid permeability enhancer include polyamine, a polyvalent metal salt, water-insoluble fine particles, and water dispersible fine particles. In particular, a polyvalent metal salt such as aluminum sulfate, especially a water-soluble polyvalent metal salt. It is possible to use, for the liquid permeability enhancer, techniques described in U.S. Pat. No. 7,179,862, U.S. Pat. No. 7,157,141, U.S. Pat. No. 6,831,142, U.S. Patent Application Publication No. 2004/176557, U.S. Patent Application Publication No. 2006/204755, U.S. Patent Application Publication No. 2006/73969, and U.S. Patent Application Publication No. 2007/106013, and European Patent No. 1165631. Note that polyamine and water-insoluble fine particles are mentioned in International Publication No. 2006/082188, International Publication No. 2006/082189, and International Publication No. 2006/082197.

Note that polyamine and a polyvalent metal salt can also be used as an ion reaction surface cross-linking agent which can be ion cross-linked with a carboxyl group of the particulate water absorbent resin. The surface cross-linking can be carried out once or a plurality of times by separately using an ion reaction cross-linking agent before or after using a dehydration reaction surface cross-linking agent.

The liquid permeability enhancer is used preferably in an amount of 0.001 part by weight to 5 parts by weight, and more preferably 0.01 part by weight to 1 part by weight with respect to 100 parts by weight of the water absorbent resin particles. In a case where the liquid permeability enhancer is used in the above range, it is possible to enhance an absorbency against pressure (AAP) and a saline flow conductivity (SFC) of the surface cross-linked water absorbent resin particles.

The liquid permeability enhancer is added preferably by a method in which the liquid permeability enhancer is preliminarily mixed with or dispersed in water and/or a hydrophilic organic solvent according to need and then the resulting solution is sprayed or dropped to be mixed with the water absorbent resin particles, and more preferably by the spray method. Note that the liquid permeability enhancer is added preferably in the cooling step carried out in a fluidized bed of the water absorbent resin particles.

The addition of the liquid permeability enhancer may be carried out simultaneously with the addition of the surface cross-linking agent, or after the heat treatment or after the cooling treatment in the surface cross-linking step. The mixing method of the present invention is applicable to each of these cases.

(2-7) Step of Binding Fine Powder

A step of binding fine powder, which step is another embodiment of the present invention, is preferably arranged such that the vertical mixing apparatus which is described earlier and meets the requirements (i) through (iii) mix fine powder and the binding agent to form a bound product, so that the bound product is discharged.

Most of the fine powder is produced by pulverization in "(2-5) Particle Size Controlling Step" or by process damage in "(2-6) Surface Treatment Step".

Fine powder to be supplied to the step of binding fine powder contains fine powder whose particle size is not more than 150 μm in an amount of 50 wt % to 100 wt %, and preferably of 70 wt % to 100 wt %. It is preferable that the binding agent contain water in an amount of 90 wt % to 100 wt %. Alternatively, an inorganic metal salt, inorganic fine particles, and an organic solvent may be mixed with this solution. Further, it is preferable to place water vapor in the mixer.

The binding agent is used in an amount preferably of not more than 100 parts by weight, more preferably not more than 70 parts by weight, and preferably not less than 10 parts by weight with respect to 100 parts by weight of the particulate water absorbent resin.

According to the method, it is possible to cause the binder to further bind the fine powder and form a bound product whose particle size is not less than 150 μm. The bound product can be identified, by use of an optical microscope, by the fact that a plurality of particles agglomerate while maintaining their shapes or the bound product is swollen as a plurality of discontinuous particles during liquid absorption. The bound product has a solid content of 50 wt % to 90 wt %, preferably of 60 wt % to 90 wt %, and particularly preferably of 60 wt % to 80 wt %.

Use of the vertical mixing apparatus, which has excellent mixing property, allows use of the binding agent in a smaller amount than before and an increase in solid content of the bound product. Therefore, a small amount of energy is required to dry the bound product. Further, this mixer allows the mixing vessel to have a high throughput of 10 kg/hr to 300 kg/hr, and more preferably 10 kg/hr to 150 kg/hr per liter of the volume of the mixing vessel.

Use of the vertical mixing apparatus causes the particulate water absorbent resin to be less likely to pass straight through the mixer or unnecessarily reside in the mixer. Therefore, the vertical mixing apparatus is characteristic in that the vertical mixing apparatus makes it easier than before to obtain a bound product which is less likely to be broken and whose particle size is uniform. In a characteristic embodiment of the present invention, the bound product, which moves so as to roll over the side wall of the mixer, is substantially spherical.

A feature of the vertical mixing apparatus is such that the dam structure of the outlet allows controlling a weight average particle diameter of the bound product to fall within a range of 0.5 mm to 5 mm. It is preferable that the bound product be subjected again to any of the steps of "(2-2) Polymerization Step", "(2-3) Step of Fine-graining Hydrogel Polymer", "(2-4) Drying Step", "(2-5) Particle Size Controlling Step" and "(2-6) Surface Treatment Step" which are described above, so as to be recycled.

Note that it is preferable that the bound product be dried and subjected to pulverization or classification, so as to be the particulate water absorbent resin whose weight average particle diameter is not less than 300 μm and not more than 600 μm. Since the bound product dried in this step is less likely to become fine powder again, it is possible to check the effect of the present invention such that the bound product is less likely to be broken.

(2-8) Other Substances to be Added to Surface Cross-Linked Water Absorbent Resin Particles A lubricant, a chelating agent, a deodorant agent, an antibacterial agent, water, a surfactant, water-insoluble fine particles, an antioxidant, a reducing agent, and the like can be added to and mixed with the surface cross-linked water absorbent resin particles in an amount of 0 wt % to 30 wt %, and further of approximately 0.01 wt % to 10 wt % during or after polymerization. Suitably usable chelating agents are mentioned in, for example, U.S. Pat. No. 6,599,989 and International Publication No. 2008/090961, and the like. Surfactants and lubricants are mentioned in U.S. Pat. No. 6,107,358, U.S. Pat. No. 7,473,739.

In a case where addition and mixing is carried out after polymerization, the addition and mixing can be carried out before or after drying, or before or after pulverization. Another substance may be added to the water absorbent resin particles provided that the another substance does not impair properties of the water absorbent resin. How to add the another substance is not particularly limited. Note that in the present invention, the water absorbent resin which contains the additive in a small amount (of, for example, more than 0 and not more than 30 wt %), i.e., the water absorbent resin which is a water absorbent resin composition is also generically referred to as a water absorbent resin.

(2-9) Other Steps

In addition to the above steps, a granulating step, a fine powder removing step, a fine powder recycling step, and the like can be provided according to need. For example, examples of other steps include steps described in, for example, U.S. Pat. No. 5,264,495, U.S. Pat. No. 5,369,148, U.S. Pat. No. 5,478,879, U.S. Pat. No. 6,228,930, U.S. Patent Application Publication No. 2006/247351, and International Publication No. 2006/101271.

[3] Properties of Water Absorbent Resin

In a case where the water absorbent resin is used for a sanitary material, especially a disposable diaper, it is preferable to cause the polymerization and the surface cross-linking to control the water absorbent resin to satisfy at least one, further not less than two including the AAP, and particularly not less than three of preferable ranges of properties mentioned in the following (a) through (h). The water absorbent resin which does not satisfy the following ranges may deliver insufficient performance to a high-concentration diaper described later.

(a) Initial Coloring

Such a water absorbent resin is efficient in initial coloring. For example, in a Hunter Lab surface color system, the water absorbent resin has an L (Lightness) value preferably of not less than 85, more preferably of not less than 87, and still more preferably of not less than 89; a b value of −5 to 10, more preferably of −5 to 5, and still more preferably of −4 to 4; and an a value of −2 to 2, at least of −1 to 1, preferably of −0.5 to 1, and most preferably of 0 to 1. The water absorbent resin has an YI value of not more than 10, more preferably of not more than 8, and particularly preferably of not more than 6, and a WB value of not less than 70, more preferably of not less than 75, and particularly preferably of not less than 77. Further, such a water absorbent resin, which is also efficient in coloring over time, is sufficiently whitened under a condition of high temperature and high humidity which is a long storage accelerating test (model).

(b) Absorbency Against Pressure (AAP)

An absorbency against pressure (AAP) refers to an absorption capacity of the water absorbent resin which is subjected to a load.

In order to prevent a leak in a disposable diaper, assuming that the polymerization is an example of means for attaining the present invention, the water absorbent resin is controlled to have an absorption capacity (AAP) preferably of not less than 10 [g/g], more preferably of not less than 15 [g/g], still more preferably of not less than 20 [g/g], more preferably of not less than 22 [g/g], and still more preferably of not less than 24 [g/g] with respect to a 0.9% by mass sodium chloride aqueous solution under pressure of 1.9 kPa, and further of 4.8 kPa. An upper limit of the absorption capacity is preferably not more than 28 [g/g], more preferably not more than 27 [g/g], and particularly preferably 26 [g/g] from the viewpoint of balance with other properties.

(c) Physiological Saline Flow Conductivity (SFC)

A physiological saline flow conductivity (SFC), which refers to a value indicating liquid permeability of the water absorbent resin that is being swollen, shows that the water absorbent resin has higher liquid permeability as the value increases.

In order to prevent a leak in a disposable diaper, assuming that the polymerization is an example of means for attaining the present invention, the SFC which is a liquid permeability property of a liquid under pressure is controlled to not less than 1 [$\times 10^{-7} \cdot cm^3 \cdot s \cdot g^{-1}$], preferably to not less than 10 [$\times 10^{-7} \cdot cm^3 \cdot s \cdot g^{-1}$], more preferably to not less than 20 [$\times 10^{-7} \cdot cm^3 \cdot s \cdot g^{-1}$], more preferably to not less than 50 [$\times 10^{-7} \cdot cm^3 \cdot s \cdot g^{-1}$], still more preferably to not less than 70 [$\times 10^{-7} \cdot cm^3 \cdot s \cdot g^{-1}$], particularly preferably to not less than 80 [$\times 10^{-7} \cdot cm^3 \cdot s \cdot g^{-1}$], and most preferably to not less than 100 [$\times 10^{-7} \cdot cm^3 \cdot s \cdot g^{-1}$].

(d) Absorbency Against Non-Pressure (CRC)

An absorbency against non-pressure (CRC) is controlled preferably to not less than 10 [g/g], more preferably to not less than 20 [g/g], still more preferably to not less than 25 [g/g], and particularly preferably to not less than 30 [g/g]. A higher CRC is preferable and an upper limit of the CRC is not particularly limited. From the viewpoint of balance with other properties, the upper limit is normally not more than 100 [g/g], preferably not more than 50 [g/g], and more preferably not more than 45 [g/g], and still more preferably not more than 40 [g/g].

(e) Water-Soluble Content (Ext)

A water-soluble content is preferably not less than 0% by mass and not more than 35% by mass, more preferably not more than 25% by mass, still more preferably not more than 15% by mass, and particularly preferably not more than 10% by mass.

(f) Residual Monomer

Assuming that the polymerization is an example of attaining the present invention, the residual monomer (a residual monomeric substance) has an amount normally of not more than 500 ppm, preferably of 0 ppm to 400 ppm, more preferably of 0 ppm to 300 ppm, and particularly preferably of 0 ppm to 200 ppm.

(g) Water Content (Solid Content)

From the viewpoint of a water absorbing rate and an impact resistance, a water content is preferably adjusted so that water remains in a given amount (for example, a water content of 0.1 wt % to 10 wt %, and more preferably of 1 wt % to 8 wt % is obtained).

It is preferable that a solid content defined by the following equation is preferably 85 wt % to 99.9 wt %, more preferably 90 wt % to 99.9 wt %, and still more preferably 95 wt % to 99.9 wt %. In a case where the solid content is beyond the above range, properties may deteriorate.

Solid Content (wt %)=100−Water Content (wt %)

(h) Weight Average Particle Diameter (D50)

From the viewpoint of properties, the final water absorbent resin which has been subjected to the above steps and the like has a weight average particle diameter (D50) of preferably of 300 μm to 600 μm, and more preferably of 350 μm to 500 μm. It is preferable that the final water absorbent resin be controlled to contain the water absorbent resin having a weight average particle diameter (D50) of 850 μm to 150 μm in an amount preferably of 90 wt % to 100 wt %, more preferably of 95 wt % to 100 wt %, and particularly preferably of 98 wt % to 100 wt %.

[4] Absorbent Core and/or Absorbing Article (Use of Water Absorbent Resin)

The water absorbent resin in accordance with the present invention is used for a purpose of absorbing water and extensively used as an absorbent core and/or an absorbing article. The water absorbent resin is suitably used especially as a sanitary material for absorbing body fluids such as urine and blood. The water absorbent resin is used especially for a high-concentration diaper (one diaper made from a large amount of water absorbent resin) which has caused problems of material-derived odor, coloring, and the like. Especially when used in an upper part of an absorbent core of the absorbing article, the water absorbent resin delivers particularly high performance.

Specifically, a particulate water absorbing agent is produced by adding other substances such as a liquid permeability enhancer, a surfactant, and a lubricant to the surface cross-linked water absorbent resin particles obtained by the method of the present invention for producing a water absorbent resin. Then, the particulate water absorbing agent is used to produce an absorbent core and/or an absorbing article. Note that how to add other substances is not particularly limited.

Note here that the absorbent core is a formed absorbing agent which is composed mainly of a particulate water absorbing agent (water absorbent resin) and hydrophilic fiber. The absorbent core is produced by use of a particulate water absorbing agent and hydrophilic fiber and formed to be, for example, film, tube, or sheet-shaped.

The absorbent core contains the particulate water absorbing agent in an amount (at a core concentration) preferably in this order of 20 wt % to 100 wt %, 30 wt % to 100 wt %, 40 wt % to 100 wt %, 50 wt % to 100 wt %, 60 wt % to 100 wt %, and 70 wt % to 100 wt %, and most preferably of 75 wt % to 95 wt %, with respect to a total mass of the particulate water absorbing agent and the hydrophilic fiber. As the core concentration of the particulate water absorbing agent is higher, an absorption property reducing effect of the particulate water absorbing agent is more noticeable during production of the absorbent core, a disposable diaper, and the like. Note that the absorbent core preferably has a thin thickness of 0.1 mm to 5 mm.

The absorbing article includes the absorbent core, a top sheet having liquid permeability, and a back sheet having liquid impermeability. The absorbing article is produced by the following method. First, an absorbent core is produced by, for example, blending or sandwiching a fiber material and a particulate water absorbing agent. Next, the absorbent core is sandwiched between the top sheet having liquid permeability and the back sheet having liquid impermeability and then provided with an elastic member, a diffusion layer, and an adhesive tape according to need, so that an absorbing article, especially an adult disposable diaper or a sanitary napkin is produced. The absorbent core is compression-molded to have a density of 0.06 g/cc to 0.50 g/cc and a basis weight of 0.01 g/cm$^2$ to 0.20 g/cm$^2$. Note that examples of a usable fiber material include hydrophilic fibers such as pulverized wood pulp, cotton linter, cross-linked cellulose fiber, rayon, cotton, wool, acetate, and vinylon. These fiber materials are preferably airlaid fiber materials.

The absorbing article has excellent absorption properties. Specific examples of such an absorbing article include sanitary materials such as an adult disposable diaper which has recently significantly grown in development, a child diaper, a sanitary napkin, and a so-called incontinence pad. However, the absorbing article is not limited to these. Due to excellent absorbing properties of the particulate water absorbing agent contained in the absorbing article, the absorbing article has a small re-wet and feels remarkably dry. This can dramatically reduce a burden of those who wear the absorbing article or their caregivers.

EXAMPLES

The following description more specifically discusses the present invention with reference to Production Examples, Examples, and Comparative Examples. However, the present invention is not limited to these. An example based on a proper combination of technical means disclosed in different examples is encompassed in the technical scope of the present invention.

Note that for convenience, the following description may refer to "part by mass" simply as "part" and "liter" simply as "L". Further, "% by mass" may be referred to as "wt %". In order to explain a dam structure of a mixer which structure is a feature of the present invention, a length in a horizontal direction from a side wall of the dam structure toward a revolving shaft is simply written as a dam length ($\alpha$) and an angle made with respect to a horizontal plane is simply written as a dam angle ($\beta$).

All electrical apparatuses used in Examples were used at a voltage of 200V or 100V unless otherwise specified. A water absorbent resin was used at a temperature of 25±2° C. and a relative humidity of 50% RH unless otherwise specified. In the following description, measurement methods, and reagents and apparatuses mentioned in Production Examples, Examples, and Comparative Examples may be appropriately replaced with corresponding articles.

[Method for Measuring Properties]

<Particle Size>

A particle size distribution and a weight average particle diameter (D50) were measured by subjecting a sample to a standard sieve, as described below.

A particle size distribution of a pulverized product was measured by the following method. 10.0 g of a pulverized product was placed in JIS standard sieves (THE IIDA TESTING SIEVE: 8 cm in diameter) having mesh opening sizes of 850 μm, 710 μm, 600 μm, 500 μm, 425 μm, 300 μm, 212 μm, 150 μm, and 45 μm at room temperature (20° C. to 25° C.) and a humidity of 50 RH %. Then, the pulverized product was subjected to classification carried out by use of an oscillating classifier (IIDA SIEVE SHAKER, TYPE: ES-65, SER. No. 0501) for 5 minutes.

A particle size of a particulate hydrogel which had not been dried was set in conformity with a method described in Japanese Patent No. 3175790. Namely, 25 g of a sampled hydrogel polymer (solid content: $\alpha$ wt %) was placed in 1200 g of a 20 wt % sodium chloride aqueous solution. The resulting solution was stirred for 60 minutes by causing a stirrer chip to revolve at 300 rpm.

The dispersion liquid thus stirred was placed in sieves (having mesh opening sizes of 9.5 mm, 8.0 mm, 4.0 mm, 2.0 mm, 0.85 mm, 0.60 mm, 0.30 mm, and 0.075 mm) and 6000 g of a 20 wt % sodium chloride aqueous solution was poured slowly from above, so that the particulate hydrogel polymer was subjected to classification. The particulate hydrogel polymer which had been subjected to classification and was placed on each of the sieves was sufficiently drained and then weighed.

A mesh opening size of a sieve was converted to a mesh opening size R (100) equivalent to 100 wt % of a solid content of a hydrogel polymer based on the following equation. A particle size distribution of a hydrogel polymer was plotted on a logarithmic probability paper, the particle size distribution being equivalent to 100 wt % of a solid content of the hydrogel polymer, i.e., being obtained by conversion when the hydrogel polymer was dry.

$$R(100) \text{ (mm)} = 3\sqrt{\frac{\alpha}{100} \cdot \frac{25}{w}} \times \gamma \text{ (mm)} \qquad \text{[Math. 2]}$$

A weight average particle diameter (D50) is a particle diameter of a standard sieve which has a given mesh opening size and corresponds to 50 wt % of the entire particles (see U.S. Pat. No. 5,051,259). Particle size distributions of a particulate water absorbent resin, a dried product, and a hydrogel polymer which distributions had been obtained by the particle size distribution measurement method (described earlier) were used to plot percentages remained (R) of respective particle sizes on the logarithmic probability paper. This allowed reading the weight average particle diameter (D50) from a particle size equivalent to R=50%.

A logarithmic standard deviation ($\sigma\zeta$) of a particle size distribution is represented by the following equation. A smaller $\sigma\zeta$ value means a narrower particle size distribution.

$$\sigma\zeta = 0.5 \times \ln(X2/X1) \qquad \text{[Math. 3]}$$

(wherein X1 is a particle size obtained when R=84.1% and X2 is a particle size obtained when R=15.9%)

<Water Content>

1 g of a hydrogel polymer or a particulate water absorbent resin was spread thin on an aluminum plate of 6 cm and then dried in a windless oven at 180° C. for three hours, thereby measuring weights of the hydrogel polymer or the particulate water absorbent resin before and after the drying. Then, the weights were substituted for the following equation, thereby measuring a water content (wt %). Note that a solid content (wt %) is defined by (100−water content) (wt %).

Water content [wt %]=[(weight before drying [g])−(weight after drying [g])]/(weight before drying [g])×100     [Math. 4]

<Absorbency Against Non-Pressure (CRC)>

0.2 g of the particulate water absorbent resin was evenly placed in a bag (60 mm×60 mm, Heatlon Paper GS-22, produced by Nangoku Pulp Industry Co., Ltd.) made of a nonwoven fabric and was heat-sealed. Then, the bag was soaked in a 0.9 wt % sodium chloride aqueous solution (physiological saline). 30 minutes later, the bag was pulled out and then drained by use of a centrifugal separator at 250×9.81 m/s² (250 G) for three minutes. Thereafter, a mass $W_1$ (g) of the bag was measured. Further, a similar operation was carried out without using the particulate water absorbent resin, and a mass $W_0$ (g) was measured in this case. Then, the absorbency against non-pressure (CRC) was calculated from the masses $W_1$ and $W_0$ based on the following Formula (1).

[Math. 5]

CRC (g/g)=(($W_1-W_0$)/mass of particulate water absorbent resin)−1     Formula (1)

Note that the CRC of the particulate water absorbent resin which had not been subjected to the heat drying step was measured by the above method except that the particulate water absorbent resin whose solid content was equivalent to 0.2 g was used and the solid content was corrected to calculate the CRC.

<Absorbency Against Pressure (AAP)>

A load was prepared to achieve a pressure of 4.83 kPa (0.7 Psi). Then, 0.90 g of the particulate water absorbent resin was evenly spread onto a 400 mesh metal gauze (having a mesh opening size of 38 μm) attached to a bottom of a plastic cylinder having a diameter of 60 mm. The load was placed on the particulate water absorbent resin, and a mass $W_2$ (g) of this set of measuring apparatuses was measured.

Next, a glass filter (manufactured by Sogo Laboratory Glass Works Co., Ltd.; having a pore diameter of 100 μm to 120 μm) having a diameter of 90 mm was placed in a petri dish having a diameter of 150 mm. Thereafter, a 0.90 wt % sodium chloride aqueous solution (20° C. to 25° C.) was added until it was at the same level as an upper surface of the glass filter.

Then, a piece of filter paper (product name "JIS P3801 No. 2"; manufactured by ADVANTEC Toyo Kaisha, Ltd.; thickness: 0.26 mm; retained particle diameter: 5 μm) having a diameter of 90 mm was placed on the resulting solution so that a surface of the filter paper was entirely wetted, and an excess of liquid was removed.

The set of measuring apparatuses was placed on the wet filter paper, so as to cause the particulate water absorbent resin to absorb the liquid under the load. One hour (60 minutes) later, the set of measuring apparatuses was lifted, and a mass $W_3$ (g) thereof was measured. The absorbency against pressure (AAP) (g/g) was calculated from the masses $W_2$ and $W_3$ based on the following Formula (2):

[Math. 6]

AAP (g/g)=($W_3-W_2$)/mass of particulate water absorbent resin (g)     Formula (2)

Note that the absorbency against pressure (AAP) was used under a pressure of 4.83 kPa (0.7 Psi) (under load), assuming that an absorbent core or an absorbing article such as a disposable diaper is used by a sleeping or sitting infant.

<Extractables>

Extractables were measured in conformity with ERT470.2-02.

<Saline Flow Conductivity (SFC)>

The saline flow conductivity (SFC) was measured in conformity with the saline flow conductivity (SFC) test described in U.S. Unexamined Patent Application Publication No. 2004-0106745 and Japanese Translation of PCT Patent Application Publication Tokuhyohei No. 09-509591.

Specifically, 0.90 g of the particulate water absorbent resin was evenly poured into a cell, and the particulate water absorbent resin was swollen for 60 minutes in synthesized urine under a pressure of 0.3 psi (2.07 kPa). In this case, a height of the resulting gel layer was recorded. Next, under a pressure of 0.3 psi (2.07 kPa), a 0.69 wt % sodium chloride aqueous solution was supplied from a tank at a constant hydrostatic pressure to permeate the swollen gel layer.

The tank had a glass tube inserted thereinto. The glass tube was provided with its lower end positioned so that a liquid surface of a 0.69 wt % sodium chloride aqueous solution in the cell was 5 cm higher than a bottom of the swollen gel. The 0.69 wt % sodium chloride aqueous solution in the tank was supplied to the cell via an L-shaped tube with a cock. Under the cell, a collecting container for collecting liquid having passed through the gel layer was provided on an even balance.

The cell had an inside diameter of 6 cm, and had a lower bottom surface provided with a No. 400 stainless metal gauze (having a mesh opening size of 38 μm). A piston had a lower part provided with a hole sufficient for the liquid to pass through, and had a bottom provided with a glass filter having such a high permeability that the particulate water absorbent resin or the swollen gel thereof did not crawl into the hole. The cell was placed on a table on which to place a cell, and the table was placed on the stainless metal gauze so as not to prevent the liquid from passing through.

The synthesized urine was prepared by mixing 0.25 g of calcium chloride dihydrate, 2.0 g of potassium chloride, 0.50 g of magnesium chloride hexahydrate, 2.0 g of sodium sulfate, 0.85 g of ammonium dihydrogen phosphate, 0.15 g of diammonium hydrogen phosphate, and 994.25 g of pure water.

Note that the SFC test was carried out at room temperature (20° C. to 25° C.). An amount of liquid passing through the gel layer was recorded for 10 minutes at 20-second intervals as a function of time by use of a computer and a balance. A flow rate Fs (t) of the liquid passing through the swollen gel (mainly between particles thereof) was determined in a unit of g/s by dividing an increased mass (g) by increased time (s).

A value of Fs (t=0), i.e., a first flow rate of the liquid passing through the gel layer was calculated by use of flow rates obtained during a 10-minute interval after "ts" at which a constant hydrostatic pressure and a stable flow rate had been obtained. Fs (t=0) was calculated by extrapolating the least square of Fs (t) against time into t=0. Then, the saline flow conductivity SFC (rate of liquid permeability against pressure) was calculated based on the following Formula (3). Note that a unit of the rate of liquid permeability against pressure is $(10^{-7} \cdot cm^3 \times s \times g^{-1})$.

[Math. 7]

$$\text{SFC } (10^{-7} \cdot \text{cm}^3 \times \text{s} \times \text{g}^{-1}) = Fs(t=0) \times L0/(\rho \times A \times \Delta P) \quad \text{Formula (3)}$$

Fs (t=0): Flow rate in "g/s"

$L_0$: Height of the gel layer in "cm"

ρ: Density of NaCl solution (1.003 g/cm³)

A: Area of an upper side of the gel layer in the cell (28.27 cm²)

ΔP: Hydrostatic pressure exerted on the gel layer (4920 dyne/cm²)

Production Example 1

A monomer aqueous solution (having a monomer concentration of 39 wt % and a neutralization ratio of 75 mol %) containing a sodium acrylate aqueous solution, acrylic acid and water was prepared in a kneader provided with two sigma-type blades. Further, polyethyleneglycol diacrylate (average number of ethylene oxide units: 9) was dissolved in the monomer aqueous solution in an amount of 0.07 mol % (with respect to the monomer).

Nitrogen gas was blown into the monomer aqueous solution, so as to reduce dissolved oxygen contained in the monomer aqueous solution and carry out nitrogen substitution in the entire kneader. Next, cold water having a temperature of 10° C. was circulated in a jacket of the kneader while the blades of the kneader were being revolved, so as to cause the monomer aqueous solution to have a temperature of 20° C.

Subsequently, 0.05 mol % (with respect to the monomer) sodium persulfate and 0.003 mol % (with respect to the monomer) L-ascorbic acid were added as polymerization initiators to the monomer aqueous solution, so as to initiate polymerization. The resulting solution was further stirred for 30 minutes, so as to carry out ripening. Then, a hydrogel polymer having a weight average particle diameter (D50) of approximately 2.0 mm was obtained as a polymerized product.

The resulting hydrogel polymer was dried in a hot-air dryer at 170° C. for 60 minutes. The resulting dried product was roughly disintegrated and then sieved by use of the JIS standard sieve having a mesh opening size of 850 μm. Next, a dried product remaining on the sieve was pulverized by use of a roll mill. The resulting pulverized product was subjected to classification by use of the sieves having mesh opening sizes of 850 μm and 180 μm. What had not passed through the sieve having a mesh opening size of 850 μm was pulverized again by use of the roll mill, so as to be subjected to the classification as described above. What had passed through the sieve having a mesh opening size of 180 μm to be subjected to classification (fine powder a) was contained in an amount of approximately 15 wt % with respect to the entire dried product.

A particulate water absorbent resin (A-1) which was obtained by the classification and located between the sieve having a mesh opening size of 850 μm and the sieve having a mesh opening size of 180 μm had a water content of 4.9 wt %, an absorbency against non-pressure (CRC) of 35 [g/g], and a weight average particle diameter (D50) of 420 μm.

The fine powder (a) of the water absorbent resin had an absorbency against non-pressure (CRC) of 34 [g/g] and a weight average particle diameter (D50) of 88 μm, and contained what had passed through the sieve having a mesh opening size of 150 μm in an amount of 80 wt %.

Example 1

Figure 4:
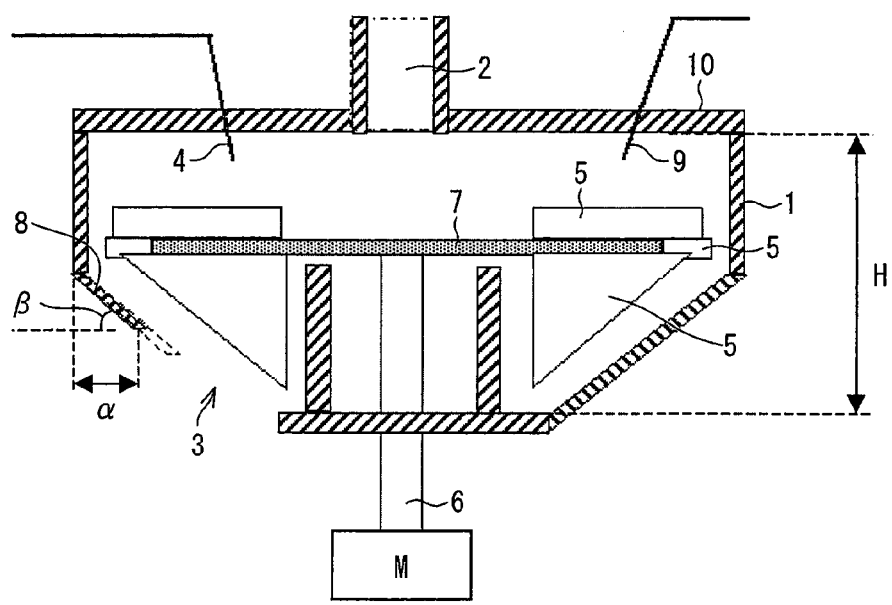
FIG. 4 is a cross-sectional view schematically illustrating an arrangement of a mixer used in each of Examples 1 through 6, 8 through 11, and 14 through 37, and Comparative Example 3.

Surface Cross-Linking Using Water Vapor And Vertical Mixer of the Present Application A vertical rotated disk-type mixer which is schematically illustrated in FIG. 4, includes three stirring vanes 5 provided in each of an upper part, a lower part, and a side surface of a partition, and has an internal volume of 5 L (having a mixing vessel having a maximum diameter (D) of 300 mm (a maximum radius of 150 mm) and a height (H) of 70 mm; having an aperture ratio of 20%, a dam length (α) of 21 mm, and a dam angle (β) of 45°; and having an inner wall coated with fluororesin) was used to cause the stirring vanes to revolve at 1000 rpm. Then, a weight or volumetric or counting feeder (produced by Accurate Inc.) was used to supply the particulate water absorbent resin (A-1) to the mixer in an amount of 200 kg/hr.

8 [kg/hr] of a composition liquid (B-1) as a surface cross-linking agent aqueous solution which contained 1,4-butanediol in an amount of 0.4 part by weight, propylene glycol in an amount of 0.6 part by weight, and water in an amount of 3.0 part by weight with respect to 100 parts by weight of the particulate water absorbent resin and 5 [kg/hr] of water vapor (having a gauge pressure of 0.6 MPa, with an interior of the mixer open) were continuously mixed while being poured into the mixer, so that a water absorbent resin mixture (C-1) was obtained.

Note that the vertical mixer includes three stirring vanes provided in each of an upper part, a lower part, and a side surface of a rotated disk and has the mixing vessel having a diameter (D) of 300 mm (a radius of 150 mm) and a height (H) of 70 mm. Note also that the vertical mixer includes an exhauster provided in an upper part of the outlet.

When the particulate water absorbent resin (A-1) was collected at an outlet of the weight or volumetric or counting feeder and then a contact thermometer was inserted thereinto to measure a temperature thereof, the particulate water absorbent resin (A-1) had a temperature of 58° C. The composition liquid (B-1) had a temperature of 26° C. The water absorbent resin mixture (C-1) obtained by the mixing had a temperature of 76° C., a water content of 9.4 wt %, and a flow rate of 212 [kg/hr]. Accordingly, an amount of water supplied by use of water vapor was 4 [kg/hr].

Note that a flow rate of the water absorbent resin mixture was found by placing the mixture in a bag for 10 minutes and measuring a weight of the mixture. A dew point of a vicinity of the outlet of the mixer was 100° C. When the mixing was stopped 30 minutes after the beginning of the mixing so as to check the interior of the mixer, no adhesion was observed.

The water absorbent resin mixture (C-1) was subjected to the heat treatment at 210° C. (an oil bath temperature) for 40 minutes while being stirred in a mortar mixer (produced by Nishinihon Shikenki). Further, particles of the water absorbent resin mixture were disintegrated until the particles passed through the sieve having a mesh opening size of 850 p.m. Then, surface cross-linked water absorbent resin particles (D-1) were obtained. Table 1 shows properties of the surface cross-linked water absorbent resin particles (D-1). Note that the surface cross-linked water absorbent resin particles (D-1) had a water content of 1%.

Example 2

Surface Cross-Linking Using Water Vapor And the Vertical Mixer of the Present Application A mixture (C-2) of the particulate water absorbent resin (A-1) and the composition liquid (B-1) and surface cross-linked water absorbent resin particles (D-2) were obtained as in the case of Example 1 except that an amount of water vapor poured was changed from 5 [kg/hr] to 15 [kg/hr]. When the mixing was stopped 30 minutes after the beginning of the mixing so as to check the interior of the mixer, no adhesion was observed. The mixture (C-2) had a temperature of 79° C., a water content of 10.2 wt %, and a flow rate of 214 [kg/hr]. Accordingly, an amount of water supplied by use of water vapor was 6 [kg/hr]. Table 1 shows properties of the surface cross-linked water absorbent resin particles (D-2).

Example 3

Surface Cross-Linking Using the Vertical Mixer of the Present Application

A mixture (E-1) of the particulate water absorbent resin (A-1) and the composition liquid (B-1) and surface cross-linked water absorbent resin particles (F-1) were obtained as in the case of Example 1 except that no water vapor was poured into the interior of the mixer. The mixture (E-1) had a temperature of 58° C. Table 1 shows properties of the surface cross-linked water absorbent resin particles (F-1).

Example 4

Surface Cross-Linking Using the Vertical Mixer of the Present Application

A mixture (E-2) of the particulate water absorbent resin (A-1) and a composition liquid (B-2) and surface cross-linked water absorbent resin particles (F-2) were obtained as in the case of Example 1 except that no water vapor was poured into the interior of the mixer and the composition liquid (B-2) which contained more water than the composition liquid (B-1) was used instead of the composition liquid (B-1). Note that the surface cross-linked water absorbent resin particles (F-2) had a water content of 1%.

Note that the composition liquid (B-2) contained 1,4-butanediol in an amount of 0.4 part by weight, propylene glycol in an amount of 0.6 part by weight, and water in an amount of 5.0 part by weight with respect to 100 parts by weight of the particulate water absorbent resin. The composition liquid (B-2) had a temperature of 25° C. The mixture (E-2) had a temperature of 58° C., and many agglomerates were observed. Table 1 shows properties of the surface cross-linked water absorbent resin particles (F-2).

Example 5

Surface Cross-Linking Using Water Vapor And the Vertical Mixer of the Present Application The mixture (E-1) of Example 3 of the particulate water absorbent resin (A-1) and the composition liquid (B-1) were placed again in the mixer used to mix the particulate water absorbent resin (A-1) and the composition liquid (B-1), and water vapor was poured into the mixer in an amount of 5 [kg/hr], so as to be water-vapor heated. The resulting mixture (C-3) had a water content of 9.0 wt %. The mixture (C-3) was subjected to the heat treatment as in the case of Example 1, so that surface cross-linked absorbent resin particles (D-3) were obtained. Table 1 shows properties of the surface cross-linked water absorbent resin particles (D-3).

Example 6

Surface Cross-Linking Using No Liquid Water but Water Vapor

A mixture (C-4) of the particulate water absorbent resin (A-1) and a composition liquid (B-3) and surface cross-linked water absorbent resin particles (D-4) were obtained as in the case of Example 1 except that the composition liquid (B-3) which contained water in an amount of 0 part by weight was used instead of the composition liquid (B-1). The composition liquid (B-3) contained 1,4-butanediol in an amount of 0.4 part by weight, propylene glycol in an amount of 0.6 part by weight, and water in an amount of 0 part by weight with respect to 100 parts by weight of the particulate water absorbent resin. The composition liquid (B-3) had a temperature of 25° C. The mixture (C-4) had a temperature of 57° C., and many agglomerates were observed. Table 1 shows properties of the surface cross-linked water absorbent resin particles (D-4).

Example 7

Surface Cross-Linking Using Water Vapor and Horizontal Mixer

A horizontal mixer (Lödige mixer, produced by Lödige) which is provided with a spade vane, a disintegrating vane, a spray nozzle (a single-fluid spray nozzle, No. 6, produced by H. Ikeuchi & Co., LTD), and a jacket, and has an internal volume of 20 L was used to stir 5.00 kg of the particulate water absorbent resin (A-1) and 0.2 kg of the composition liquid (B-1), which had been obtained in Production Example 1 and whose temperatures had been adjusted to 60° C., for 30 seconds while saturated water vapor having a gauge pressure of 0.6 kPa was being supplied from a nozzle (a straight pipe having an internal diameter of 3 mm) at a flow rate of 5 [kg/hr] (with an interior of the stirrer open). Note that the mixer revolved at 200 rpm, the disintegrating vane revolved at 2000 rpm, and the jacket had a temperature of 60° C.

A mixture (C-5) of the particulate water absorbent resin (A-1) and the composition liquid (B-1) which had been obtained by the mixing had more agglomerates than the mixture (C-1) of Example 1. The mixture (C-5) had a temperature of 82° C. and a water content of 10.1 wt %. Note that the mixture (C-5) had a weight of 5.35 kg and water supplied by use of water vapor was accordingly 0.15 kg. The mixture (C-5) had been subjected to the heat treatment carried out by use of the mortar mixer of Example 1, and the resulting particles were disintegrated until the particles passed through the sieve having a mesh opening size of 850 µm. Then, surface cross-linked water absorbent resin particles (D-5) were obtained. Table 1 shows properties of the surface cross-linked water absorbent resin particles (D-5).

Comparative Example 1

Surface Cross-Linking Using The Horizontal Mixer without Pouring Water Vapor

A mixture (G-1) of the particulate water absorbent resin (A-1) and the composition liquid (B-1) and surface cross-linked water absorbent resin particles (H-1) were obtained as in the case of Example 7 except that no water vapor was supplied. The (G-1) had a temperature of 61° C. Table 1 shows properties of the surface cross-linked water absorbent resin particles (H-1).

Comparative Example 2

Surface Cross-Linking Using The Horizontal Mixer without Pouring Water Vapor The particulate water absorbent resin (A-1) obtained in Production Example 1 was packed in a bag and then placed in an oven, so as to be heated to 60° C.

Figure 6:
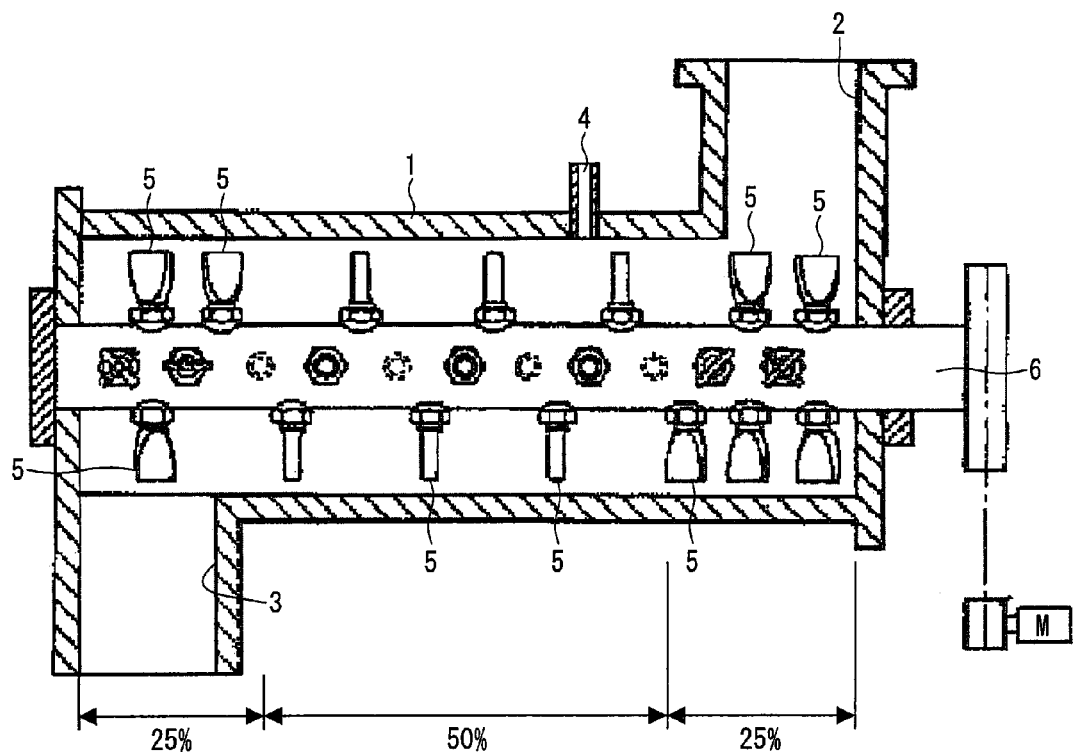
FIG. 6 is a cross-sectional view schematically illustrating an arrangement of a horizontal mixer used in each of Comparative Examples 2, 5, and 7.

In a horizontal continuous mixer illustrated in FIG. 6, a stirring blade was revolved at 1300 rpm and the particulate water absorbent resin (A-1) obtained in Production Example 1 was supplied from a feed opening (an inlet) 2 provided at a right end of a revolving shaft 6 in a casing of the horizontal continuous mixer by use of the weight or volumetric or counting feeder (produced by Accurate Inc.) in an amount of 200 kg/hr.

The powder and a surface treatment agent were continuously mixed while air was being supplied via one end of the horizontal continuous mixer, i.e., the feed opening (inlet) 2 provided at the right end in FIG. 6 with a pressure in the casing of the horizontal continuous mixer reduced to not more than 5 mm $H_2O$ and 8 kg/hr of the surface treatment agent was being sprayed via an additive feed opening (additive inlet) 4 which was provided 200 mm away from a right end of the casing assuming that the revolving shaft 6 in the casing of the horizontal continuous mixer had a total length of 490 mm.

Note that, when the particulate water absorbent resin (A-1) was collected at the outlet of the weight or volumetric or counting feeder and then the contact thermometer was inserted thereinto to measure a temperature thereof, the particulate water absorbent resin (A-1) had a temperature of 58° C.

The surface treatment agent contained 1,4-butanediol in a composition ratio (mass ratio) of 0.4, propylene glycol in a composition ratio (mass ratio) of 0.6, and water in a composition ratio (mass ratio) of 3.0 with respect to 100 parts by mass of the water absorbent resin. The resulting mixture (G-2) was subjected to the heat treatment in the mortar mixer at 200° C. for 40 minutes while being stirred, so that surface cross-linked water absorbent resin particles (H-2) were obtained. Table 1 shows properties of the surface cross-linked water absorbent resin particles (H-2).

Comparative Example 3

Influence of Powder Temperature of Water Absorbent Resin in the Vertical Mixer of the Present Application Operation was carried out as in the case of Example 3 except that the oven was not used to heat the particulate water absorbent resin. In this case, when the particulate water absorbent resin (A-1) was collected at the outlet of the weight or volumetric or counting feeder and then the contact thermometer was used to measure a temperature thereof the particulate water absorbent resin (A-1) had a temperature of 24° C. When the mixing was stopped 30 minutes after the beginning of the mixing so as to check the interior of the mixer, adhesion of the water absorbent resin to the side wall of the mixer was observed.

TABLE 1

|  | Water absorbent resin particles | Absorbency against non-pressure CRC [g/g] | Absorbency against pressure AAP 0.7 Psi [g/g] | Saline flow conductivity SFC [×10$^{-7}$ · cm$^3$ × s × g$^{-1}$] |
|---|---|---|---|---|
| Ex. 1 | D-1 | 27.8 | 24 | 105 |
| Ex. 2 | D-2 | 28.0 | 25 | 110 |
| Ex. 3 | F-1 | 27.6 | 25 | 84 |
| Ex. 4 | F-2 | 28.5 | 22 | 75 |
| Ex. 5 | D-3 | 27.5 | 23 | 90 |
| Ex. 6 | D-4 | 27.0 | 19 | 62 |
| Ex. 7 | D-5 | 27.5 | 23 | 100 |
| Com. Ex. 1 | H-1 | 27.4 | 21 | 79 |
| Com. Ex. 2 | H-2 | 27.4 | 21 | 79 |

(Summary)

It was revealed that the saline flow conductivity (SFC) was higher in Example 7 (in which the horizontal mixer was used, and water vapor was poured (or a temperature of the resulting water absorbent resin mixture was increased by not less than 2° C.)) than in Comparative Examples 1 and 2 (in which the horizontal mixer was used) (see Table 1). Note that a comparison between Example 1 and Example 4 in each of which the vertical mixer of the present application was used and an amount of water absorbed was 5 parts by weight revealed that use of water vapor dramatically increased (i) the absorbency against pressure (AAP) from 22 [g/g] (Comparative Example 2) to 24 [g/g] (Example 1) and (ii) the saline flow conductivity (SFC) from 75 [×10$^{-7}$·cm$^3$×s×g$^{-1}$] (Comparative Example 2) to 105 [×10$^{-7}$·cm$^3$×s×g$^{-1}$] (Example 1). Furthermore, it was revealed that the absorbency against pressure (AAP) was higher in Example 3 (in which the vertical mixer of the present application was used) than in Comparative Examples 1 and 2 (in which the horizontal mixer was used). Moreover, it was revealed that both the absorbency against pressure (AAP) and the saline flow conductivity (SFC) were higher in Examples 1 and 2 (in which the vertical mixer of the present application was used, and water vapor was poured (or a temperature of the resulting water absorbent resin mixture was increased by not less than 2° C.)).

It was revealed that both the absorbency against pressure (AAP) and the saline flow conductivity (SFC) were higher in Example 1 than in Example 6. Accordingly, water is added more preferably by use of liquid water and water vapor in combination than by use of water vapor alone.

Further, it was revealed that both the absorbency against pressure (AAP) and the saline flow conductivity (SFC) were higher in Example 1 than in Example 5. Accordingly, water vapor as water is added preferably simultaneously with addition of the surface cross-linking agent.

Example 8

Further Use of Aluminum Sulfate

Aluminum sulfate was further used in Example 1 in which water vapor and the vertical mixer of the present application were used for surface cross-linking. Namely, 35 g of the surface cross-linked water absorbent resin particles (D-1) obtained in Example 1 and 10 g of glass bead were placed in a 225 ml mayonnaise bottle and then shaken, as a shock-resistant model in a production process, by use of a paint shaker (produced by TOYO SEIKI Co., Ltd.) for 30 minutes. Next, 0.3 g of a liquid permeability enhancer which contained a 50% aluminum sulfate aqueous solution in an amount of 1.0 part by weight, propylene glycol in an amount of 0.025 part by weight, and sodium lactate in an amount of 0.3 part by weight with respect to 100 parts by weight of the water absorbent resin particles thus shaken was added to and mixed with 30 g of the water absorbent resin particles. Thereafter, the resulting solution was cured in a dryer at 60° C. for 30 minutes. After the curing, the resulting cured product was placed in the 225 ml mayonnaise bottle containing 10 g of the glass bead and was then shaken by use of the paint shaker for 10 minutes, so that an aluminum surface-treated product (I-1) was obtained. Table 2 shows properties of the aluminum surface-treated product (I-1).

Example 9

Further Use of Aluminum Sulfate

Aluminum sulfate was further used in Example 3 in which the vertical mixer of the present application was used for surface cross-linking. Namely, operation was carried out as in the case of Example 8 except that the surface cross-linked water absorbent resin particles (D-1) were replaced with the surface cross-linked water absorbent resin particles (F-1) in Example 8, so that an aluminum surface-treated product (I-2) was obtained. Table 2 shows properties of the aluminum surface-treated product (I-2).

Example 10

Further Use of Aluminum Sulfate

Aluminum sulfate was further used in Example 4 in which the vertical mixer of the present application was used for surface cross-linking. Namely, operation was carried out as in the case of Example 8 except that the surface cross-linked water absorbent resin particles (D-1) were replaced with the surface cross-linked water absorbent resin particles (F-2) in Example 8, so that an aluminum surface-treated product (I-3) was obtained. Table 2 shows properties of the aluminum surface-treated product (I-3).

Comparative Example 4

Further Use of Aluminum Sulfate

Aluminum sulfate was further used in Comparative Example 1 in which neither water vapor nor the vertical mixer was used. Namely, operation was carried out as in the case of Example 8 except that the surface cross-linked water absorbent resin particles (D-1) were replaced with the surface cross-linked water absorbent resin particles (H-1), so that an aluminum surface-treated product (J-1) was obtained. Table 2 shows properties of the aluminum surface-treated product (J-1).

Example 11

Continuous Mixing of Aluminum Sulfate Using the Vertical Mixer of the Present Application The surface cross-linked water absorbent resin particles (F-1) obtained in Example 3 were packed in a polypropylene bag and then placed in an oven, so as to be heated to 100° C. 5 kg/hr of a surface treatment agent containing aluminum sulfate 14-18 hydrate, sodium lactate, and water was continuously mixed with 500 kg/hr of the surface cross-linked water absorbent resin particles (F-1) by use of a similar vertical rotated disk-type mixer to that used in Example 1 while being poured. Note that, when the particulate water absorbent resin (F-1) was collected at the outlet of the weight or volumetric or counting feeder and then the contact thermometer was inserted thereinto to measure a temperature thereof, the particulate water absorbent resin (F-1) had a temperature of 94° C.

A composition liquid (the surface treatment agent) contained aluminum sulfate 14-18 hydrate in a composition ratio (mass ratio) of 0.4, sodium lactate in a composition ratio (mass ratio) of 0.1, and water in a composition ratio (mass ratio) of 0.5 with respect to 100 parts by mass of the water absorbent resin. The resulting mixture was subjected to the heat treatment at 100° C. for 10 minutes while being stirred, so that water absorbent resin particles (K-1) were obtained. Table 2 shows properties of the surface cross-linked water absorbent resin particles (K-1).

Comparative Example 5

Continuous Mixing of Aluminum Sulfate Using the Horizontal Mixer

The surface cross-linked water absorbent resin particles (F-1) obtained in Example 3 were packed in a polypropylene bag and then placed in an oven, so as to be heated to 100° C. 5 kg/hr of a surface treatment agent containing aluminum sulfate 14-18 hydrate, sodium lactate, and water was continuously mixed with 500 kg/hr of the surface cross-linked water absorbent resin particles (F-1) by use of a similar horizontal continuous mixer to that used in Comparative Example 2 while being poured. Note that, when the particulate water absorbent resin (D-5) was collected at the outlet of the weight or volumetric or counting feeder and then the contact thermometer was inserted thereinto to measure a temperature thereof, the particulate water absorbent resin (D-5) had a temperature of 95° C. The surface treatment agent contained aluminum sulfate 14-18 hydrate in a composition ratio (mass ratio) of 0.4, sodium lactate in a composition ratio (mass ratio) of 0.1, and water in a composition ratio (mass ratio) of 0.5 with respect to 100 parts by mass of the water absorbent resin. The resulting mixture was subjected to the heat treatment at 100° C. for 10 minutes while being stirred, so that water absorbent resin particles (L-1) were obtained. Table 2 shows properties of the aluminum surface-treated water absorbent resin particles (L-1).

TABLE 2

| | Aluminum surface-treated product | Absorbency against non-pressure CRC [g/g] | Absorbency against pressure AAP 0.7 Psi [g/g] | Saline flow conductivity SFC [$\times 10^{-7}$ · cm$^3$ × s × g$^{-1}$] | SFC increase rate[1] [$\times 10^{-7}$ · cm$^3$ × s × g$^{-1}$] |
|---|---|---|---|---|---|
| Ex. 8 | I-1 | 27.6 | 23 | 140 | 35 |
| Ex. 9 | I-2 | 27.4 | 24 | 105 | 21 |
| Ex. 10 | I-3 | 28.3 | 21 | 90 | 15 |
| Ex. 11 | K-1 | 27.2 | 24 | 125 | 41 |
| Com. Ex. 4 | J-1 | 27.1 | 20 | 91 | 12 |
| Com. Ex. 5 | L-1 | 27.0 | 20 | 109 | 25 |

[1]Rate of increase in SFC due to liquid permeability enhancer (Summary)

Table 2 shows a result of further using a liquid permeability enhancer (aluminum sulfate) in the surface cross-linking whose result is shown in Table 1. A comparison between Example 8 and Example 10 in each of which an amount of water absorbed was 5 parts by weight revealed that even the liquid permeability enhancer (aluminum sulfate) added in an equal amount after surface cross-linking affected the saline flow conductivity (SFC) and its increase rate depending on whether or not water vapor is used (see Table 2). Namely, the SFC of Example 8 was 140 [$\times 10^{-7} \cdot cm^3 \times s \times g^{-1}$] (increase rate: 35 [$\times 10^{-7} \cdot cm^3 \times s \times g^{-1}$]), whereas the SFC of Example 10 was 90 [$\times 10^{-7} \cdot cm^3 \times s \times g^{-1}$] (increase rate: 15 [$\times 10^{-7} \cdot cm^3 \times s \times g^{-1}$]).

It was revealed that, in a case where the vertical mixer of the present application was used to mix the surface cross-linking agent and the method was also employed for using water vapor to add a part or all of water in the mixer (or the method for increasing a temperature of the resulting water absorbent resin mixture by not less than 2° C.), it was possible to obtain great effects of a high saline flow conductivity (SFC) and an increase in saline flow conductivity (SFC) due to the liquid permeability enhancer.

Further, it was revealed that the SFC increased at a higher rate in Example 11 in which the vertical mixer of the present application was used than in Comparative Example 5 in which the horizontal mixer was used as an apparatus for mixing the surface cross-linked water absorbent resin particles and aluminum sulfate. This shows that the vertical mixer of the present application has excellent mixing property.

Example 12

Binding of Fine Powder Using the Vertical Mixer of the Present Application

The fine powder (a) of the water absorbent resin obtained in Production Example 1 was packed in a bag and then placed in an oven, so as to be heated to 60° C.

A vertical rotated disk-type mixer which is schematically illustrated in FIG. 5, includes three stirring vanes provided in each of an upper part and a lower part of a partition and nine stirring vanes provided in a side surface of the partition, and has an internal volume of 5 L (having a mixing vessel having a maximum diameter (D) of 300 mm (a maximum radius of 150 mm) and a height (H) of 70 mm; having an aperture ratio of 20%, a dam length (α) of 0.5 mm, and a dam angle ((3); and having an inner wall coated with fluororesin) was used to cause the stirring vanes to revolve at 1100 rpm. Then, the weight or volumetric or counting feeder (produced by Accurate Inc.) was used to supply the fine powder (a) to the mixer in an amount of 500 kg/hr, and the fine powder (a) and water were continuously mixed while the water was being poured in an amount of 167 kg/hr. Note that, when the fine powder (a) was collected at the outlet of the weight or volumetric or counting feeder and then the contact thermometer was inserted thereinto to measure a temperature thereof, the fine powder (a) had a temperature of 57° C. A bound product which was indefinite in shape and massive was obtained via the outlet of the mixer. The bound product had a water content of 29%.

The bound product was taken out from the mixer after the mixing and then dried in the hot-air dryer at 170° C. for minutes. Thereafter, the resulting dried product was pulverized until the entire dried product passed through the sieve having a mesh opening size of 850 μm.

Water absorbent particles (a1) obtained by the pulverization had an absorbency against non-pressure (CRC) of 33 g/g and a weight average particle diameter (D50) of 370 μm, and contained powder whose particle diameter was not more than 150 μm in an amount of 18 wt %.

Example 13

Binding of Fine Powder Using the Vertical Mixer of the Present Application

A bound product and a pulverized product (a2) thereof were obtained as in the case of Example 12 except that the dam structure of the mixer was changed by setting the dam length (α) to 21 mm and the dam angle (β) to 20°. The bound product, which was spherical, was subjected to classification immediately, so as to measure a particle size distribution. As a result, the bound product had a weight average particle diameter (D50) of 4.0 mm and a logarithmic standard deviation (σζ) of 0.54. The pulverized product (a2) had an absorbency against non-pressure (CRC) of 34 g/g and a weight average particle diameter (D50) of 400 μm, and contained particulate water absorbent resin whose particle size was not more than 150 μm in an amount of 13 wt %.

Comparative Example 6

Influence of Powder Temperature of Water Absorbent Resin in the Vertical Mixer of the Present Application Operation was carried out as in the case of Example 12 except that the oven was not used to heat the fine powder. In this case, when the particulate water absorbent resin (a) was collected at the outlet of the weight or volumetric or counting feeder and then the contact thermometer was used to measure a temperature thereof, the particulate water absorbent resin (a) had a temperature of 23° C. When the mixing was stopped 30 minutes after the beginning of the mixing so as to check the interior of the mixer, adhesion of the water absorbent resin to the inlet and the side wall of the mixer was observed.

Comparative Example 7

Water Absorbent Resin in the Horizontal Mixer

The fine powder (a) of the water absorbent resin obtained in Production Example 1 was packed in a bag and then placed in an oven, so as to be heated to 60° C. In the horizontal continuous mixer illustrated in FIG. 6, the stirring blade was revolved at 1300 rpm and the fine powder (a) of the water absorbent resin obtained in Production Example 1 was supplied from the feed opening provided at the right end of the revolving shaft 6 in the casing of the horizontal continuous mixer by use of the weight or volumetric or counting feeder (produced by Accurate Inc.) in an amount of 500 kg/hr.

The powder and a surface treatment agent were continuously mixed while air was being supplied via one end of the horizontal continuous mixer, i.e., the feed opening provided at the right end in FIG. 6 with a pressure in the casing of the horizontal continuous mixer reduced to not more than 5 mm H$_2$O and 167 kg/hr of water was being sprayed via the additive feed opening 4 which was provided 200 mm away from the right end of the casing assuming that the revolving shaft 6 in the casing of the horizontal continuous mixer had a total length of 490 mm.

When the particulate water absorbent resin (A-1) was collected at the outlet of the weight or volumetric or counting feeder and then the contact thermometer was inserted thereinto to measure a temperature thereof, the particulate water absorbent resin (A-1) had a temperature of 58° C. The mixing was stopped 10 minutes after the beginning of the mixing due to an increase in current value of the mixer. When the interior of the mixer was checked, intense adhesion and a gross agglomerate were observed there.

Production Example 2

A 48.5 wt % sodium hydroxide aqueous solution, acrylic acid, and water were supplied so that the resulting monomer aqueous solution had a monomer concentration of 45 wt % and a neutralization ratio of 70 mol %. Further, to the monomer aqueous solution, polyethyleneglycol diacrylate (average number of ethylene oxide units: 9) was added in an amount of 0.07 mol % (with respect to the monomer) and a 1 wt % diethylenetriamine pentaacetic acid trisodium aqueous solution was added in an amount of 100 ppm (with respect to the monomer), so that the monomer aqueous solution was mixed continuously. In this case, the monomer aqueous solution had a temperature of 95° C.

A 1.0 wt % sodium persulfate aqueous solution was further added to the monomer aqueous solution thus prepared in an amount of 0.05 g/mol (with respect to the monomer). Thereafter, the monomer aqueous solution was continuously supplied onto an endless belt which was kept warm at approximately 100° C. and was running at a speed of 200 cm/min. The monomer aqueous solution continuously supplied onto the belt immediately initiated polymerization, so that a belt-like hydrogel sheet (hydrogel polymer) was obtained.

The hydrogel sheet was continuously grained by use of a meat chopper (produced by Hiraga Kousakusho Co., Ltd.) having a screen whose diameter was 9.5 mm, so that a hydrogel polymer whose weight average particle diameter (D50) was approximately 2.0 mm was obtained as a polymerized product.

The resulting hydrogel polymer was dried in a hot-air dryer at 170° C. for 60 minutes. The resulting dried product was roughly disintegrated and then sieved by use of the JIS standard sieve having a mesh opening size of 850 μm. Next, a dried product remaining on the sieve was pulverized by use of a roll mill. The resulting pulverized product was subjected to classification by use of the sieves having mesh opening sizes of 850 μm and 180 μm. What had not passed through the sieve having a mesh opening size of 850 μm was pulverized again by use of the roll mill, so as to be subjected to the classification as described above. What had passed through the sieve having a mesh opening size of 180 μm to be subjected to classification was contained in an amount of approximately 15 wt % with respect to the entire dried product.

A particulate water absorbent resin (A-2) which was obtained by the classification and located between the sieve having a mesh opening size of 850 μm and the sieve having a mesh opening size of 180 μm had a water content of 5.1 wt %, an absorbency against non-pressure (CRC) of 36 [g/g], and a weight average particle diameter (D50) of 400 μm.

Example 14

Surface cross-linked water absorbent resin particles (M-1) were obtained as in the case of Example 1 except that in Example 1, the particulate water absorbent resin (A-1) was replaced with the particulate water absorbent resin (A-2) and the heat treatment was carried out at 212° C. (an oil bath temperature) for 35 minutes. Table 3 shows properties of the surface cross-linked water absorbent resin particles (M-1). Note that in the step of adding the composition liquid (B-1) in the mixer, the resulting water absorbent resin mixture was increased in temperature by 18° C. as compared to the particulate water absorbent resin (A-2).

Example 15

Surface cross-linked water absorbent resin particles (M-2) were obtained as in the case of Example 14 except that in Example 14, the composition liquid (B-1) was replaced with a composition liquid (B-4) containing 1,4-butanediol in an amount of 0.9 part by weight and water in an amount of 3.0 part by weight with respect to 100 parts by weight of the particulate water absorbent resin and the heat treatment was carried out at 218° C. (an oil bath temperature) for 25 minutes. Table 3 shows properties of the surface cross-linked water absorbent resin particles (M-2). Note that in the step of adding the composition liquid (B-4) in the mixer, the resulting water absorbent resin mixture was increased in temperature by 19° C. as compared to the particulate water absorbent resin (A-2).

Example 16

Surface cross-linked water absorbent resin particles (M-3) were obtained as in the case of Example 14 except that in Example 14, the composition liquid (B-1) was replaced with a composition liquid (B-5) containing 1,6-hexanediol in an amount of 0.9 part by weight and water in an amount of 3.0 part by weight with respect to 100 parts by weight of the particulate water absorbent resin and the heat treatment was carried out at 218° C. (an oil bath temperature) for 35 minutes. Table 3 shows properties of the surface cross-linked water absorbent resin particles (M-3). Note that in the step of adding the composition liquid (B-5) in the mixer, the resulting water absorbent resin mixture was increased in temperature by 17° C. as compared to the particulate water absorbent resin (A-2).

Example 17

Surface cross-linked water absorbent resin particles (M-4) were obtained as in the case of Example 14 except that in Example 14, the composition liquid (B-1) was replaced with a composition liquid (B-6) containing ethylene carbonate in an amount of 0.9 part by weight and water in an amount of 3.0 part by weight with respect to 100 parts by weight of the particulate water absorbent resin and the heat treatment was carried out at 218° C. (an oil bath temperature) for 20 minutes. Table 3 shows properties of the surface cross-linked water absorbent resin particles (M-4). Note that in the step of adding the composition liquid (B-6) in the mixer, the resulting water absorbent resin mixture was increased in temperature by 18° C. as compared to the particulate water absorbent resin (A-2).

Example 18

Surface cross-linked water absorbent resin particles (N-1) were obtained as in the case of Example 14 except that in Example 14, no water vapor was poured into the interior of the mixer and the composition liquid (B-2) was used instead of the composition liquid (B-1). Table 3 shows properties of the surface cross-linked water absorbent resin particles (N-1). Note that in the step of adding the composition liquid (B-2) in the mixer, the resulting water absorbent resin mixture was increased in temperature by 0° C. as compared to the particulate water absorbent resin (A-2).

Example 19

Surface cross-linked water absorbent resin particles (N-2) were obtained as in the case of Example 15 except that in Example 15, no water vapor was poured into the interior of the mixer and a composition liquid (B-7) which contained more water than the composition liquid (B-4) by an amount as much as an amount of water absorbed by use of water vapor was used instead of the composition liquid (B-4). Note that the composition liquid (B-7) contained 1,4-butanediol in an amount of 0.9 part by weight and water in an amount of 5.0 part by weight with respect to 100 parts by weight of the particulate water absorbent resin. Table 3 shows properties of the surface cross-linked water absorbent resin particles (N-2). Note that in the step of adding the composition liquid (B-7) in the mixer, the resulting water absorbent resin mixture was increased in temperature by 0° C. as compared to the particulate water absorbent resin (A-2).

Example 20

Surface cross-linked water absorbent resin particles (N-3) were obtained as in the case of Example 16 except that in Example 16, no water vapor was poured into the interior of the mixer and a composition liquid (B-8) which contained more water than the composition liquid (B-5) by an amount as much as an amount of water absorbed by use of water vapor in Example 11 was used instead of the composition liquid (B-5). Note that the composition liquid (B-8) contained 1,6-hexanediol in an amount of 0.9 part by weight and water in an amount of 5.0 part by weight with respect to 100 parts by weight of the particulate water absorbent resin. Table 3 shows properties of the surface cross-linked water absorbent resin particles (N-3). Note that in the step of adding the composition liquid (B-8) in the mixer, the resulting water absorbent resin mixture was increased in temperature by 0° C. as compared to the particulate water absorbent resin (A-2).

Example 21

Surface cross-linked water absorbent resin particles (N-4) were obtained as in the case of Example 17 except that in Example 17, no water vapor was poured into the interior of the mixer and a composition liquid (B-9) which contained more water than the composition liquid (B-6) by an amount equivalent to that of water absorption using water vapor was used instead of the composition liquid (B-6). Note that the composition liquid (B-9) contained ethylene carbonate in an amount of 0.9 part by weight and water in an amount of 5.0 part by weight with respect to 100 parts by weight of the particulate water absorbent resin. Table 3 shows properties of the surface cross-linked water absorbent resin particles (N-4). Note that in the step of adding the composition liquid (B-9) in the mixer, the resulting water absorbent resin mixture was increased in temperature by 0° C. as compared to the particulate water absorbent resin (A-2).

TABLE 3

| | Water absorbent resin | Temperature increase [2)] [° C.] | Absorbency against non-pressure CRC [g/g] | Absorbency against pressure AAP 0.7 Psi [g/g] | Saline flow conductivity SFC [×10$^{-7}$ · cm$^3$ × s × g$^{-1}$] |
|---|---|---|---|---|---|
| Ex. 14 | M-1 | 18 | 27.1 | 24 | 100 |
| Ex. 15 | M-2 | 19 | 27.4 | 25 | 96 |
| Ex. 16 | M-3 | 17 | 27.8 | 25 | 103 |
| Ex. 17 | M-4 | 18 | 28.0 | 25 | 92 |
| Ex. 18 | N-1 | 0 | 27.4 | 23 | 81 |
| Ex. 19 | N-2 | 0 | 27.9 | 23 | 70 |
| Ex. 20 | N-3 | 0 | 28.0 | 24 | 85 |
| Ex. 21 | N-4 | 0 | 28.3 | 23 | 76 |

[2)] An increase in temperature of the resulting water absorbent resin mixture as compared to the particulate water absorbent resin (A-2) in the step of adding the surface cross-linking agent and water in the mixer (Summary)

As shown in Table 3, it was revealed that in each of the examples in which the vertical mixer of the present application was used, and water vapor was used or a mixture was increased in temperature, the surface cross-linked water absorbent resin particles showed an improvement in properties in terms of the absorbency against pressure (AAP) or the saline flow conductivity (SFC), especially the SFC.

Example 22

Aluminum sulfate was further used in Example 14. Namely, 35 g of the surface cross-linked water absorbent resin particles (M-1) obtained in Example 14 and 10 g of glass bead were placed in a 225 ml mayonnaise bottle and then shaken, as a shock-resistant model in a production process, by use of a paint shaker (produced by TOYO SEIKI Co., Ltd.) for 30 minutes. Next, 0.3 g of a liquid permeability enhancer which contained a 50% aluminum sulfate aqueous solution in an amount of 1.0 part by weight, propylene glycol in an amount of 0.025 part by weight, and sodium lactate in an amount of 0.3 part by weight with respect to 100 parts by weight of the water absorbent resin particles thus shaken was added to and mixed with 30 g of the water absorbent resin particles. Thereafter, the resulting solution was cured in a dryer at 60° C. for 30 minutes. After the curing, the resulting cured product was placed in the 225 ml mayonnaise bottle containing 10 g of the glass bead and was then shaken by use of the paint shaker for 10 minutes, so that an aluminum surface-treated product (O-1) was obtained. Table 4 shows properties of the aluminum surface-treated product (O-1).

Example 23

Aluminum sulfate was further used in Example 15. Namely, operation was carried out as in the case of Example except that the surface cross-linked water absorbent resin particles (M-1) were replaced with the surface cross-linked water absorbent resin particles (M-2) in Example 22, so that an aluminum surface-treated product (O-2) was obtained. Table 4 shows properties of the aluminum surface-treated product (O-2).

Example 24

Aluminum sulfate was further used in Example 16. Namely, operation was carried out as in the case of Example except that the surface cross-linked water absorbent resin particles (M-1) were replaced with the surface cross-linked water absorbent resin particles (M-3) in Example 22, so that an aluminum surface-treated product (O-3) was obtained. Table 4 shows properties of the aluminum surface-treated product (O-3).

Example 25

Aluminum sulfate was further used in Example 17. Namely, operation was carried out as in the case of Example except that the surface cross-linked water absorbent resin particles (M-1) were replaced with the surface cross-linked water absorbent resin particles (M-4) in Example 22, so that an aluminum surface-treated product (O-4) was obtained. Table 4 shows properties of the aluminum surface-treated product (O-4).

Example 26

Aluminum sulfate was further used in Example 18. Namely, operation was carried out as in the case of Example except that the surface cross-linked water absorbent resin particles (M-1) were replaced with the surface cross-linked water absorbent resin particles (N-1) in Example 22, so that an aluminum surface-treated product (P-1) was obtained. Table 4 shows properties of the aluminum surface-treated product (P-1).

Example 27

Aluminum sulfate was further used in Example 19. Namely, operation was carried out as in the case of Example 22 except that the surface cross-linked water absorbent resin particles (M-1) were replaced with the surface cross-linked water absorbent resin particles (N-2) in Example 22, so that an aluminum surface-treated product (P-2) was obtained. Table 4 shows properties of the aluminum surface-treated product (P-2).

Example 28

Aluminum sulfate was further used in Example 20. Namely, operation was carried out as in the case of Example except that the surface cross-linked water absorbent resin particles (M-1) were replaced with the surface cross-linked water absorbent resin particles (N-3) in Example 22, so that an aluminum surface-treated product (P-3) was obtained. Table 4 shows properties of the aluminum surface-treated product (P-3).

Example 29

Aluminum sulfate was further used in Example 21. Namely, operation was carried out as in the case of Example except that the surface cross-linked water absorbent resin particles (M-1) were replaced with the surface cross-linked water absorbent resin particles (N-4) in Example 22, so that an aluminum surface-treated product (P-4) was obtained. Table 4 shows properties of the aluminum surface-treated product (P-4).

TABLE 4

| | Water absorbent resin | Absorbency against non-pressure CRC [g/g] | Absorbency against pressure AAP 0.7 Psi [g/g] | Saline flow conductivity SFC [×10$^{-7}$· cm$^3$ × s × g$^{-1}$] | SFC increase rate[3] [×10$^{-7}$· cm$^3$ × s × g$^{-1}$] |
|---|---|---|---|---|---|
| Ex. 22 | O-1 | 27.0 | 24 | 127 | 27 |
| Ex. 23 | O-2 | 27.0 | 23 | 145 | 49 |
| Ex. 24 | O-3 | 27.2 | 24 | 142 | 39 |
| Ex. 25 | O-4 | 27.7 | 24 | 119 | 27 |
| Ex. 26 | P-1 | 27.3 | 23 | 103 | 22 |
| Ex. 27 | P-2 | 27.3 | 22 | 100 | 30 |
| Ex. 28 | P-3 | 27.8 | 24 | 112 | 27 |
| Ex. 29 | P-4 | 28.0 | 23 | 97 | 21 |

[3]Rate of increase in SFC due to liquid permeability enhancer (Summary)

As shown in Table 4, it was revealed that in each of the examples in which the vertical mixer of the present application was used, and the liquid permeability enhancer (aluminum sulfate) was used in an identical amount after the surface cross-linking, a greater effect of enhancing the saline flow conductivity (SFC) was obtained by using water vapor or increasing a temperature of a mixture during the mixing of the each surface cross-linking agent than in a case where no water vapor was used or the temperature of the mixture was not increased.

Example 30

Silica was further used in Example 14. Namely, 35 g of the surface cross-linked water absorbent resin particles (M-1) obtained in Example 14 and 10 g of glass bead were placed in a 225 ml mayonnaise bottle and then shaken by use of a paint shaker (produced by TOYO SEIKI Co., Ltd.) for 30 minutes. Next, silica (AEROSIL200, produced by Nippon Aerosil Co., Ltd.) was added as the liquid permeability enhancer to the water absorbent resin particles thus shaken in an amount of 0.5 part by weight with respect to 100 parts by weight of the water absorbent resin particles, so that a silica surface-treated product (Q-1) was obtained. Table 5 shows properties of the silica surface-treated product (Q-1).

Example 31

Silica was further used in Example 15. Namely, operation was carried out as in the case of Example 30 except that the surface cross-linked water absorbent resin particles (M-1) were replaced with the surface cross-linked water absorbent resin particles (M-2) in Example 30, so that a silica surface-treated product (Q-2) was obtained. Table 5 shows properties of the aluminum surface-treated product (Q-2).

Example 32

Silica was further used in Example 16. Namely, operation was carried out as in the case of Example 30 except that the surface cross-linked water absorbent resin particles (M-1) were replaced with the surface cross-linked water absorbent resin particles (M-3) in Example 30, so that a silica surface-treated product (Q-3) was obtained. Table 5 shows properties of the aluminum surface-treated product (Q-3).

Example 33

Silica was further used in Example 17. Namely, operation was carried out as in the case of Example 30 except that the surface cross-linked water absorbent resin particles (M-1) were replaced with the surface cross-linked water absorbent resin particles (M-4) in Example 30, so that a silica surface-treated product (Q-4) was obtained. Table 5 shows properties of the aluminum surface-treated product (Q-4).

Example 34

Silica was further used in Example 18. Namely, operation was carried out as in the case of Example 30 except that the surface cross-linked water absorbent resin particles (M-1) were replaced with the surface cross-linked water absorbent resin particles (N-1) in Example 30, so that a silica surface-treated product (R-1) was obtained. Table 5 shows properties of the aluminum surface-treated product (R-1).

Example 35

Silica was further used in Example 19. Namely, operation was carried out as in the case of Example 30 except that the surface cross-linked water absorbent resin particles (M-1) were replaced with the surface cross-linked water absorbent resin particles (N-2) in Example 30, so that a silica surface-treated product (R-2) was obtained. Table 5 shows properties of the aluminum surface-treated product (R-2).

Example 36

Silica was further used in Example 20. Namely, operation was carried out as in the case of Example 30 except that the surface cross-linked water absorbent resin particles (M-1) were replaced with the surface cross-linked water absorbent resin particles (N-3) in Example 30, so that a silica surface-treated product (R-3) was obtained. Table 5 shows properties of the aluminum surface-treated product (R-3).

Example 37

Silica was further used in Example 21. Namely, operation was carried out as in the case of Example 30 except that the surface cross-linked water absorbent resin particles (M-1) were replaced with the surface cross-linked water absorbent resin particles (N-4) in Example 30, so that a silica surface-treated product (R-4) was obtained. Table 5 shows properties of the aluminum surface-treated product (R-4).

TABLE 5

| | Water absorbent resin | Absorbency against non-pressure CRC [g/g] | Absorbency against pressure AAP 0.7 Psi [g/g] | Saline flow conductivity SFC [×10$^{-7}$ · cm$^3$ × s × g$^{-1}$] | SFC increase rate[3] [×10$^{-7}$ · cm$^3$ × s × g$^{-1}$] |
|---|---|---|---|---|---|
| Ex. 30 | Q-1 | 26.8 | 23 | 118 | 18 |
| Ex. 31 | Q-2 | 27.3 | 22 | 110 | 14 |
| Ex. 32 | Q-3 | 27.0 | 22 | 116 | 13 |
| Ex. 33 | Q-4 | 27.9 | 22 | 110 | 18 |
| Ex. 34 | R-1 | 27.4 | 22 | 89 | 8 |
| Ex. 35 | R-2 | 27.6 | 21 | 80 | 10 |
| Ex. 36 | R-3 | 27.9 | 22 | 95 | 10 |
| Ex. 37 | R-4 | 28.0 | 21 | 87 | 11 |

[3])Rate of increase in SFC due to liquid permeability enhancer (Summary)

As shown in Table 5, it was revealed that as in the case of adding aluminum sulfate, in each of the examples in which the vertical mixer of the present application was used, and water vapor was used or a mixture was increased in temperature, the silica surface-treated products yielded a greater effect of enhancing the saline flow conductivity (SFC) than in a case where no water vapor was used or the temperature of the mixture was not increased.

Note that the present invention described above can also be described as below.

(1) A method for producing a water absorbent resin which method is a method for producing surface cross-linked water absorbent resin particles, the method including the successive steps of: (a) adding a surface cross-linking agent and water to a particulate water absorbent resin in a mixer; and (b) reacting the resulting water absorbent resin mixture taken out from the mixer with the surface cross-linking agent in a reactor by heating or active energy ray irradiation, water vapor being used as a part or all of the water added in the mixer.

(2) A method for producing a water absorbent resin which method is a method for producing surface cross-linked water absorbent resin particles, the method including the successive steps of: (a) adding a surface cross-linking agent and water to a particulate water absorbent resin in a mixer; and (b) reacting the resulting water absorbent resin mixture taken out from the mixer with the surface cross-linking agent in a reactor by heating or active energy ray irradiation, in the step (a), the resulting water absorbent resin mixture being increased in temperature by not less than 2° C. as compared to the particulate water absorbent resin.

(3) The method mentioned in (1) and arranged such that a liquid and water vapor are used in combination as the water added to the particulate water absorbent resin.

(4) The method mentioned in (1) or (2) and arranged such that a surface cross-linking agent aqueous solution and water vapor are used in combination as the water added to the particulate water absorbent resin.

(5) The method mentioned in any one of (1) through (3) and arranged such that 0.1 part by weight to 10 parts by weight of water is mixed with 100 parts by weight of the particulate water absorbent resin, and 0 wt % to 95 wt % of the water mixed with the particulate water absorbent resin is a liquid.

(6) The method mentioned in any one of (1) through (4) and arranged such that the particulate water absorbent resin supplied to the mixer is lower in temperature than water vapor by 10° C. to 100° C.

(7) The method mentioned in any one of (1) through (5) and arranged such that an inner surface of the mixer is lower in temperature than water vapor by 10° C. to 100° C.

(8) The method mentioned in any one of (1) through (6) and arranged such that: the mixer and the reactor are connected to each other so as to carry out the steps (a) and (b) continuously; and the particulate water absorbent resin resides in the mixer for 1 second to 5 minutes on average and the water absorbent resin mixture resides in the reactor for 6 minutes to 10 hours on average.

(9) The method mentioned in any one of (1) through (7) and arranged such that the surface cross-linking agent can be subjected to a dehydration reaction with a carboxyl group.

(10) The method mentioned in any one of (1) through (8) and arranged such that the particulate water absorbent resin has absorbed water supplied as the water vapor in an amount of 0.1 part by weight to 10 parts by weight with respect to 100 parts by weight of the particulate water absorbent resin supplied to the mixer.

(11) The method mentioned in any one of (1) through (9) and arranged such that the water vapor is supplied at a pressure (gauge pressure) of 0.01 MPa to 1 MPa.

(12) The method mentioned in any one of (1) through (10) and arranged such that a dew point in the mixer is 60° C. to 100° C.

(13) The method mentioned in any one of (1) through (11) and arranged such that the particulate water absorbent resin supplied to the mixer has a temperature of 30° C. to 90° C.

(14) The method mentioned in any one of (1) through (12) and arranged such that the mixer is a vertical mixer.

(15) The method mentioned in any one of (1) through (14) and arranged such that at least one kind of liquid permeability enhancer selected from the group consisting of polyamine, a polyvalent metal salt, and water-insoluble fine particles is further added simultaneously with or after surface cross-linking by use of a covalent surface cross-linking agent.

(16) The method mentioned in any one of (1) through (15) and arranged such that the resulting water absorbent resin mixture is increased in temperature by 3° C. to 60° C. as compared to the particulate water absorbent resin supplied to the mixer.

(17) The method mentioned in any one of (1) through (16) and arranged such that continuous production is carried out at a throughput of not less than 1 t per hour.

(18) The method mentioned in any one of (1) through (17) and arranged such that the resulting water absorbent resin mixture taken out from the mixer has a temperature of 50° C. to 140° C.

(19) The method mentioned in any one of (1) through (18) and arranged such that an exhauster which is kept warm or warmed is provided between the mixer and an inlet of the reactor.

Note that the present invention described above can also be described as below.

(1) A method for producing a water absorbent resin which method is arranged such that: in the step of mixing a particulate water absorbent resin and an additive, a temperature of the particulate water absorbent resin is preset to 30° C. to 150° C.; and a continuous mixing apparatus is used which meets the following requirements (i) through (iii): (i) at least one stirring vane revolves at 300 rpm to 3000 rpm; (ii) a revolving shaft of the at least one stirring vane is in a vertical direction; and (iii) a mixing vessel is vertically divided into two or more rooms by a partition whose aperture ratio is 5% to 70%.

(2) The method mentioned in (1) and arranged such that in the step of mixing a particulate water absorbent resin and an additive, a temperature of the particulate water absorbent resin is preset to 40° C. to 120° C.

(3) The method mentioned in (1) or (2) and arranged such that the additive is an aqueous solution or an aqueous dispersion liquid.

(4) The method mentioned in any one of (1) through (3) and arranged such that the additive contains a cross-linking agent.

(5) The method mentioned in any one of (1) through (4) and arranged such that an inner wall of the mixer is heated or kept warm.

(6) The method mentioned in (5) and arranged such that the inner wall of the mixer is heated to 50° C. to 150° C.

(7) The method mentioned in any one of (1) through (6) and arranged such that a part or all of the inner wall of the mixer is made of a material which is in contact with water at an angle of not less than 60° and has a heat distortion temperature of not less than 70° C.

(8) The method mentioned in any one of (1) through (7) and arranged such that the mixer is provided with the partition whose aperture ratio is 5% to 70% and which rotates about the revolving shaft of the at least one stirring vane.

(9) The method mentioned in any one of (1) through (8) and arranged such that the mixer is provided with an outlet which is closer to the revolving shaft than to an orbit made by a tip of the at least one stirring vane.

(10) The method mentioned in any one of (1) through (9) and arranged such that the mixer is provided with the outlet having a dam structure in which an angle with respect to a horizontal plane and/or a length in a horizontal direction from a side wall of the mixer to the revolving shaft can be changed provided that the angle falls within a range of 10° to 80° and the length falls within a range of 1% to 40% of a maximum radius of the mixing vessel.

(11) The method mentioned in any one of (1) through (10) and arranged such that the mixer has a value (H/D) of 0.1 to 1, the value being obtained by dividing a height (H) of an interior of the mixing vessel by a maximum diameter (D) of the mixing vessel.

(12) The method mentioned in any one of (1) through (11) and arranged such that the particulate water absorbent resin is supplied to the mixer in an amount of 10 kg/hr to 300 kg/hr per liter of the volume of the mixing vessel of the mixer.

(13) The method mentioned in any one of (1) through (12) and arranged such that in the mixer, water vapor is introduced into the mixing vessel.

The embodiments and concrete examples of implementation discussed in the aforementioned detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A water absorbent resin obtained by a method of the present invention for producing the water absorbent resin has excellent absorption properties and the like (an absorbency against pressure, liquid permeability, and the like). Such a particulate water absorbent resin can be extensively used as (i) an absorbing agent for use in sanitary materials such as an adult disposable diaper which has recently significantly grown in development, a child diaper, a sanitary napkin, and a so-called incontinence pad, (ii) a water-soluble polymer which is suitably used for a flocculant, a coagulant, a soil conditioner, a soil stabilizer, a thickener, and the like, or (iii) a water retention agent, a dehydrating agent, and the like in fields of agricultural gardening and engineering works.

REFERENCE SIGNS LIST

1 Side wall
2 Inlet
3 Outlet
4 Inlet for additive
5 Stirring vane
6 Revolving shaft
7 Partition
8 Dam (a part defined by a dotted line so as to follow the dam shows that a length of the dam is variable)
9 Inlet for water vapor
10 Mixing layer (Casing)

The invention claimed is:

1. A method for producing a water absorbent resin which method is a method for producing surface cross-linked water absorbent resin particles, wherein:
   in the step (a) of adding a surface cross-linking agent and water to a particulate water absorbent resin in a mixer, a temperature of the particulate water absorbent resin is preset to 30° C. to 150° C.; and
   a continuous mixing apparatus is used which meets the following requirements (i) through (iii):
   (i) at least one stirring vane revolves at 300 rpm to 3000 rpm;
   (ii) a revolving shaft of the at least one stirring vane is in a vertical direction; and
   (iii) a mixing vessel is vertically divided into two or more rooms by a partition whose aperture ratio is 5% to 70%; and
   the particulate water absorbent resin is supplied to the mixer in an amount of 10 kg/hr to 300 kg/hr per liter of the volume of the mixing vessel of the mixer.

2. The method as set forth in claim 1, wherein an inner wall of the mixer is heated to 50° C. to 150° C.

3. The method as set forth in claim 1, wherein a part or all of the inner wall of the mixer is made of a material which is in contact with water at an angle of not less than 60° and has a heat distortion temperature of not less than 70° C.

4. The method as set forth in claim 1, wherein the mixer is provided with the partition whose aperture ratio is 5% to 70% and which rotates about the revolving shaft of the at least one stirring vane.

5. The method as set forth in claim 1, wherein the mixer is provided with an outlet having a dam structure in which an angle with respect to a horizontal plane and/or a length in a horizontal direction from a side wall of the mixer to the revolving shaft can be changed provided that the angle falls within a range of 10° to 80° and the length falls within a range of 1% to 40% of a maximum radius of the mixing vessel.

6. The method as set forth in claim 1, wherein the mixer has a value (H/D) of 0.1 to 1, the value being obtained by dividing a height (H) of an interior of the mixing vessel by a maximum diameter (D) of the mixing vessel.

* * * * *